US012732979B2

(12) United States Patent
Lei et al.

(10) Patent No.: US 12,732,979 B2
(45) Date of Patent: Sep. 8, 2026

(54) TECHNIQUES FOR ACCESSING MULTIPLE RADIO ACCESS TECHNOLOGY SPECTRUM SHARING

(71) Applicant: QUALCOMM Incorporated, San Diego, CA (US)

(72) Inventors: Jing Lei, San Diego, CA (US); Jing Jiang, San Diego, CA (US); Kianoush Hosseini, San Diego, CA (US); Kangqi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/334,899

(22) Filed: Jun. 14, 2023

(65) Prior Publication Data

US 2024/0422756 A1 Dec. 19, 2024

(51) Int. Cl.

| | |
|---|---|
| ***H04L 5/00*** | (2006.01) |
| ***H04L 5/14*** | (2006.01) |
| ***H04L 27/26*** | (2006.01) |
| ***H04W 16/14*** | (2009.01) |
| ***H04W 56/00*** | (2009.01) |
| ***H04W 72/0457*** | (2023.01) |
| ***H04W 72/1268*** | (2023.01) |
| ***H04W 72/20*** | (2023.01) |
| ***H04W 72/563*** | (2023.01) |

(Continued)

(52) U.S. Cl.

CPC ... *H04W 72/0457* (2023.01); *H04W 56/0015* (2013.01); *H04W 72/20* (2023.01)

(58) Field of Classification Search

CPC ..... H04W 48/12; H04W 76/27; H04W 76/30; H04W 72/23; H04W 74/006; H04W 72/1273; H04W 36/0061; H04W 76/11; H04W 8/24; H04B 7/06952; H04B 7/1851

USPC .......................................................... 370/329

See application file for complete search history.

(56) References Cited

U.S. PATENT DOCUMENTS

| | | | | |
|---|---|---|---|---|
| 2016/0277991 A1* | 9/2016 | Yang | .................. | H04W 36/322 |
| 2019/0132862 A1* | 5/2019 | Jeon | .................. | H04W 72/0453 |

(Continued)

FOREIGN PATENT DOCUMENTS

WO WO-2022031500 A1 2/2022

OTHER PUBLICATIONS

Partial International Search Report—PCT/US2024/029770—ISA/EPO—Sep. 10, 2024.

(Continued)

*Primary Examiner* — Marcus Smith
*Assistant Examiner* — Jason A Harley
(74) *Attorney, Agent, or Firm* — Holland & Hart LLP/QUALCOMM Incorporated

(57) ABSTRACT

Methods, systems, and devices for wireless communications are described that provide for multi-RAT spectrum sharing (MRSS) for network access procedures. MRSS may provide common resources for initial access information for each of two or more RATs. In some aspects, an initial bandwidth part (BWP) configuration may be provided for a MRSS cell, and a user equipment (UE) supporting MRSS, as well as UEs that support only one RAT (e.g., a legacy UE that supports an older technology RAT), may monitor for network access information in the common resources, such as a synchronization signal block (SSB) that provides access information for two RATs.

27 Claims, 28 Drawing Sheets

(51) Int. Cl.
*H04W 76/11* (2018.01)
*H04W 76/22* (2018.01)

(56) References Cited

U.S. PATENT DOCUMENTS

| | | | | |
|---|---|---|---|---|
| 2019/0149380 | A1* | 5/2019 | Babaei | H04W 72/23 370/330 |
| 2021/0266753 | A1* | 8/2021 | Kumar | H04W 28/0252 |
| 2021/0274535 | A1* | 9/2021 | Yi | H04W 72/0446 |
| 2022/0182842 | A1 | 6/2022 | Baldemair et al. | |
| 2023/0122988 | A1* | 4/2023 | Al-Imari | H04W 68/02 370/329 |
| 2023/0328644 | A1* | 10/2023 | Wu | H04L 5/005 370/311 |
| 2024/0155657 | A1* | 5/2024 | Mu | H04L 5/0053 |
| 2024/0251364 | A1* | 7/2024 | Kim | H04B 7/18513 |

OTHER PUBLICATIONS

International Search Report and Written Opinion—PCT/US2024/029770—ISA/EPO—Nov. 6, 2024.

* cited by examiner

TECHNIQUES FOR ACCESSING MULTIPLE RADIO ACCESS TECHNOLOGY SPECTRUM SHARING

FIELD OF TECHNOLOGY

The following relates to wireless communications, including techniques for accessing multiple radio access technology spectrum sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for accessing multiple radio access technology (RAT) spectrum sharing. In accordance with various aspects, multi-RAT spectrum sharing (MRSS) may be provided for network access procedures in which common resources are provided for initial access information for each of two or more RATs. In some aspects, an initial bandwidth part (BWP) configuration may be provided for a MRSS cell, and UEs supporting MRSS, as well as UEs that support only one RAT (e.g., a legacy UE that supports an older technology RAT), may operate on the initial BWP and monitor for network access information in the common resources. For example, two or more RATs may share synchronization signal block (SSB), such as a cell-defining SSB (CD-SSB) or non-cell-defining SSB (NCD-SSB), and a default initial downlink BWP (e.g., for control resource set (CORESET) #0 that is indicated by a master information block (MIB) of a CD-SSB). In some cases, MRSS cells may have separate initial BWP configurations, such as a separate initial downlink BWP in addition to the default initial BWP, a separate initial uplink BWP that can have a different location and bandwidth than an initial BWP for UEs that support only a previous generation RAT, or combinations thereof. In some cases, additionally or alternatively, a UE of one RAT may request activation of a downlink reference signal (e.g., SSB, tracking reference signal (TRS), positioning reference signal (PRS)) in the initial downlink BWP.

Additionally, or alternatively, a UE of one RAT (e.g., a MRSS-capable 6G UE) may perform early measurements on candidate frequencies of an initial BWP (e.g., on candidate frequencies for carrier aggregation (CA), dual connectivity (DC), or MRSS), and report the early measurements on the MRSS cell by initiating a random access or small data transmission (SDT) procedure. Such a UE may be provided with a list of candidate cells, candidate carrier frequencies, or both, for early measurement reporting before or after releasing a radio resource control (RRC) connection. After releasing the RRC connection, an MRSS-capable UE may be provided with updated information for early measurements and reporting when the random access or SDT procedure is ongoing, or when the UE is monitoring a multicast control channel (MCCH), multicast traffic channel (MTCH), or short message communications.

A method for wireless communications by a user equipment (UE) is described. The method may include receiving configuration information that indicates a first initial downlink bandwidth part (BWP) to monitor for network access control signaling, where a first radio access technology and a second radio access technology share a set of wireless resources that are configured within the first initial downlink BWP, operating on the first initial downlink BWP and monitoring the network access control signaling that includes network access information for both the first radio access technology and the second radio access technology, and transmitting a network access request using the first radio access technology based on the network access information from the network access control signaling.

A UE for wireless communication is described. The UE may include one or more processors, one or more memories coupled with the one or more processors, and instructions stored in the one or more memories. The instructions may be executable by the one or more processors to cause the UE to receive configuration information that indicates a first initial downlink bandwidth part (BWP) to monitor for network access control signaling, where a first radio access technology and a second radio access technology share a set of wireless resources that are configured within the first initial downlink BWP, operate on the first initial downlink BWP and monitoring the network access control signaling that includes network access information for both the first radio access technology and the second radio access technology, and transmit a network access request using the first radio access technology based on the network access information from the network access control signaling.

Another UE for wireless communication is described. The UE may include means for receiving configuration information that indicates a first initial downlink bandwidth part (BWP) to monitor for network access control signaling, where a first radio access technology and a second radio access technology share a set of wireless resources that are configured within the first initial downlink BWP, means for operating on the first initial downlink BWP and monitoring the network access control signaling that includes network access information for both the first radio access technology and the second radio access technology, and means for transmitting a network access request using the first radio access technology based on the network access information from the network access control signaling.

A non-transitory computer-readable medium storing code for wireless communication at a UE is described. The code may include instructions executable by one or more processors to receive configuration information that indicates a first initial downlink bandwidth part (BWP) to monitor for network access control signaling, where a first radio access technology and a second radio access technology share a set of wireless resources that are configured within the first initial downlink BWP, operate on the first initial downlink BWP and monitoring the network access control signaling that includes network access information for both the first radio access technology and the second radio access technology, and transmit a network access request using the first radio access technology based on the network access information from the network access control signaling.

In some examples of the method, UEs, and non-transitory computer-readable medium described herein, the monitoring may include operations, features, means, or instructions for monitoring for a cell-defining (CD) synchronization signal block (SSB) and system information transmitted within the first initial downlink BWP, where the CD SSB and system information provide synchronization and network access information for both the first radio access technology and the second radio access technology. Some examples of the method, UEs, and non-transitory computer-readable medium described herein may further include operations, features, means, or instructions for receiving additional configuration information associated with the first radio access technology that indicates one or more of a second initial downlink BWP or a second initial uplink BWP that may be associated with access for the first radio access technology, where the one or more of the second initial downlink BWP or the second initial uplink BWP may be provided in addition to the first initial downlink BWP shared by the first radio access technology and the second radio access technology, or a first initial uplink BWP associated with the second radio access technology. In some examples of the method, UEs, and non-transitory computer-readable medium described herein, the second initial downlink BWP may have an associated center frequency that may be unaligned with a center frequency of one or more of the first initial downlink BWP, the second initial uplink BWP associated with the first radio access technology, or the first initial uplink BWP associated with the second radio access technology.

Some examples of the method, UEs, and non-transitory computer-readable medium described herein may further include operations, features, means, or instructions for receiving, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology and monitoring the second initial downlink BWP for at least the portion of the additional network access control signaling. In some examples of the method, UEs, and non-transitory computer-readable medium described herein, the control signaling further indicates a second initial uplink BWP associated with network access for the first radio access technology that is different than a first initial uplink BWP associated with network access for the second radio access technology, and where the second initial uplink BWP is switched independent of which of the first initial downlink BWP or the second initial downlink BWP is monitored for the network access control signaling.

Some examples of the method, UEs, and non-transitory computer-readable medium described herein may further include operations, features, means, or instructions for transmitting, based on the configuration information for the first radio access technology, a request for activation of an on-demand downlink reference signal responsive to determining that the second initial downlink BWP does not include a CD-SSB and monitoring for the on-demand downlink reference signal on the second initial downlink BWP responsive to the request being granted, or switch to the first initial downlink BWP to monitor for a CD-SSB responsive to the request not being granted. In some examples of the method, UEs, and non-transitory computer-readable medium described herein, the request for activation of the on-demand downlink reference signal may be an explicit request or an implicit request provided via a physical random access channel (PRACH), a physical uplink shared channel (PUSCH), a physical uplink control channel (PUCCH), or any combinations thereof.

Some examples of the method, UEs, and non-transitory computer-readable medium described herein may further include operations, features, means, or instructions for receiving a set of candidate frequencies associated with one or more cells configured for shared access of both the first radio access technology and the second radio access technology, measuring one or more reference signals received via one or more candidate frequencies of the set of candidate frequencies, and transmitting a measurement report for the one or more reference signals in a random access message or in a small data transmission message. In some examples of the method, UEs, and non-transitory computer-readable medium described herein, the set of candidate frequencies may be received in one or more of RRC signaling, a system information communication, or a MBS communication, and where the set of candidate frequencies may be received before or after releasing an RRC connection at the UE.

A method for wireless communications by a UE is described. The method may include receiving a set of candidate frequencies for one or more measurements associated with a first initial downlink bandwidth part (BWP) that is used for wireless communications of both a first radio access technology and a second radio access technology, measuring one or more channel parameters associated with one or more candidate frequencies of the set of candidate frequencies, and transmitting a measurement report of the one or more channel parameters in a network access request using the first radio access technology or in a small data transmission using the first radio access technology.

A UE for wireless communication is described. The UE may include one or more processors, one or more memories coupled with the one or more processors, and instructions stored in the one or more memories. The instructions may be executable by the one or more processors to cause the UE to receive a set of candidate frequencies for one or more measurements associated with a first initial downlink BWP that is used for wireless communications of both a first radio access technology and a second radio access technology, measure one or more channel parameters associated with one or more candidate frequencies of the set of candidate frequencies, and transmit a measurement report of the one or more channel parameters in a network access request using the first radio access technology or in a small data transmission using the first radio access technology.

Another UE for wireless communication is described. The UE may include means for receiving a set of candidate frequencies for one or more measurements associated with a first initial downlink BWP that is used for wireless communications of both a first radio access technology and a second radio access technology, means for measuring one or more channel parameters associated with one or more candidate frequencies of the set of candidate frequencies, and means for transmitting a measurement report of the one or more channel parameters in a network access request using the first radio access technology or in a small data transmission using the first radio access technology.

A non-transitory computer-readable medium storing code for wireless communication at a UE is described. The code may include instructions executable by one or more processors to receive a set of candidate frequencies for one or more measurements associated with a first initial downlink BWP that is used for wireless communications of both a first radio access technology and a second radio access technology, measure one or more channel parameters associated with one or more candidate frequencies of the set of candidate frequencies, and transmit a measurement report of the one or more channel parameters in a network access request using the first radio access technology or in a small data transmission using the first radio access technology.

In some examples of the method, UEs, and non-transitory computer-readable medium described herein, the set of candidate frequencies may be received in one or more of RRC signaling, a system information communication, or a MBS communication, and where the set of candidate frequencies may be received before or after releasing an RRC connection at the UE. Some examples of the method, UEs, and non-transitory computer-readable medium described herein may further include operations, features, means, or instructions for receiving, after a release of an RRC connection, an updated set of candidate frequencies for one or more measurements, where the updated set of candidate frequencies may be received as part of a random access procedure, as part of a small data transmission procedure, via a MCCH, via a MTCH, or as part of short message communication in an RRC inactive state or RRC idle state.

Some examples of the method, UEs, and non-transitory computer-readable medium described herein may further include operations, features, means, or instructions for receiving configuration information that indicates the first initial downlink BWP is to be monitored for network access control signaling, where the first radio access technology and the second radio access technology share a set of wireless resources that are configured within the first initial downlink BWP, operating on the first initial downlink BWP and monitoring the network access control signaling that includes network access information for both the first radio access technology and the second radio access technology, and transmitting a network access request to using the first radio access technology based on the network access information from the network access control signaling. In some examples of the method, UEs, and non-transitory computer-readable medium described herein, the monitoring may include operations, features, means, or instructions for monitoring for a CD-SSB and system information that may be transmitted within the first initial downlink BWP, where the CD-SSB and system information provide network access information for both the first radio access technology and the second radio access technology.

A method for wireless communications by a network entity is described. The method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP, transmitting, via the first initial downlink BWP, the network access control signaling, where the network access control signaling provides information for both the first radio access technology and the second radio access technology, and receiving, from the first UE, a network access request using the first radio access technology.

A network entity for wireless communication is described. The network entity may include one or more processors, one or more memories coupled with the one or more processors, and instructions stored in the one or more memories. The instructions may be executable by the one or more processors to cause the network entity to transmit configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP, transmit, via the first initial downlink BWP, the network access control signaling, where the network access control signaling provides information for both the first radio access technology and the second radio access technology, and receive, from the first UE, a network access request using the first radio access technology.

Another network entity for wireless communication is described. The network entity may include means for transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP, means for transmitting, via the first initial downlink BWP, the network access control signaling, where the network access control signaling provides information for both the first radio access technology and the second radio access technology, and means for receiving, from the first UE, a network access request using the first radio access technology.

A non-transitory computer-readable medium storing code for wireless communication at a network entity is described. The code may include instructions executable by one or more processors to transmit configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP, transmit, via the first initial downlink BWP, the network access control signaling, where the network access control signaling provides information for both the first radio access technology and the second radio access technology, and receive, from the first UE, a network access request using the first radio access technology.

In some examples of the method, network entities, and non-transitory computer-readable medium described herein, the network access control signaling may be provided in a CD-SSB and system information transmitted in the first initial downlink BWP, where the CD-SSB and system information provide network access information for both the first radio access technology and the second radio access technology. Some examples of the method, network entities, and non-transitory computer-readable medium described herein may further include operations, features, means, or instructions for transmitting, to the first UE, additional configuration information associated with the first radio access technology that indicates one or more of a second initial downlink BWP or a second initial uplink BWP that are associated with network access for the first radio access technology, where the one or more of the second initial downlink BWP or the second initial uplink BWP are provided in addition to the first initial downlink BWP.

Some examples of the method, network entities, and non-transitory computer-readable medium described herein may further include operations, features, means, or instructions for transmitting, to the first UE while the first UE is in an idle or inactive state, control signaling that indicates BWP switching from the first initial downlink BWP to a second initial downlink BWP to monitored at least a portion of the network access control signaling and transmitting, within the second initial downlink BWP, at least the portion of the network access control signaling associated with the first radio access technology. Some examples of the method, network entities, and non-transitory computer-readable medium described herein may further include operations, features, means, or instructions for receiving, from the first UE based on the configuration information, a request for activation of an on-demand downlink reference signal and transmitting, responsive to the request for activation, one of the on-demand downlink reference signal in the second initial downlink BWP, or control signaling that triggers the UE to switch to the first initial downlink BWP to monitor for a CD-SSB in the first initial downlink BWP.

Some examples of the method, network entities, and non-transitory computer-readable medium described herein may further include operations, features, means, or instructions for transmitting, to the first UE, a set of candidate frequencies associated with one or more cells configured for shared access of both the first radio access technology and the second radio access technology, transmitting one or more reference signals using one or more candidate frequencies of the set of candidate frequencies, and receiving a measurement report for the one or more reference signals from the first UE in a random access message or in a small data transmission message.

DETAILED DESCRIPTION

Figure 1:
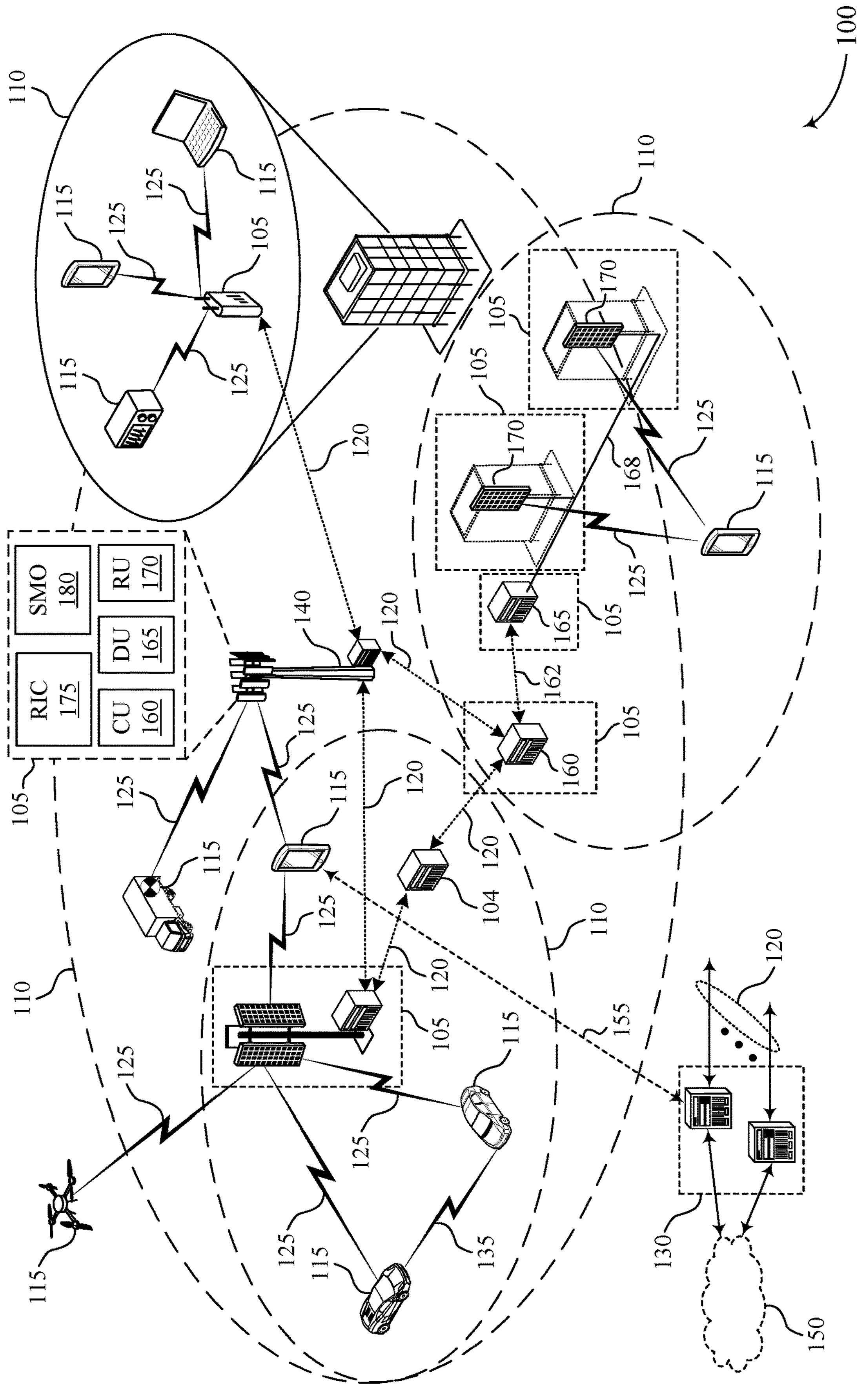
FIG. 1 shows an example of a wireless communications system that supports techniques for accessing multiple radio access technology spectrum sharing in accordance with one or more aspects of the present disclosure.

As wireless communications technology advances, newer generations of wireless communications are deployed that may support enhanced services for users. For example, fourth generation (4G) and fifth generation (5G) networks commonly support communications for wireless devices, and sixth generation (6G) networks may be deployed that support further enhanced communications. In some cases, an operator may desire to support two or more different radio access technologies (RATs) using a same set of wireless resources. For example, an operator may desire to use a same frequency band for some aspects of both 5G and 6G communications. In some 6G deployments, it is expected that 6G higher bands (e.g., frequency range (FR)3 or FR4 bands above 7 GHZ) may be used with a lower band anchor (e.g., a sub-7 GHZ anchor band), in which the wireless spectrum of the anchor band may be shared with a 5G RAT. For example, due to long-life clients that use 5G technology (e.g., automobiles, smart meters, appliances, factory equipment, etc.) operators may desire to support 5G communications along with 6G communications for a relatively long time, and techniques as discussed herein provide for such multi-RAT spectrum sharing (MRSS).

Spectrum sharing for 4G and 5G systems has been implemented for operators to use same spectrum for both 4G and 5G deployments, through a process known as dynamic spectrum sharing (DSS). However, DSS uses separate resources (e.g., time and/or frequency resources) for each radio access technology (RAT), and devices using the different RATs obtain initial access information from the associated separate resources of the corresponding RAT. Further, 4G scheduling constraints (e.g., 1 ms minimum timing for reallocating resources between 4G and 5G) and always-on reference signals (e.g., cell-specific reference signal (CRS) in 4G is in symbols 0 and 4 in a slot for a single antenna port) may impede flexibility for providing SSB and initial access information for 5G communications. Thus, enhanced techniques for providing spectrum sharing for multiple RATs to provide initial access may be desirable that avoids the constraints of, and consumes less overhead than, DSS.

In accordance with various aspects, MRSS may be provided for network access procedures in which common resources are provided for network access information for each of two or more RATs. In some aspects, an initial bandwidth part (BWP) configuration may be provided for a MRSS cell, and user equipment (UE) supporting MRSS (e.g., a 6G UE), as well as UEs that support only one RAT (e.g., a legacy UE that supports an older technology RAT, such as a 5G RAT), may monitor for network access information in the common resources. For example, two or more RATs may share one or more synchronization signal blocks (SSBs), such as a cell-defining SSB (CD-SSB), non-cell-defining SSB (NCD-SSB), and a default initial downlink BWP (e.g., for control resource set (CORESET) #0 that is indicated by a master information block (MIB) of a CD-SSB).

In some cases, MRSS cells may have separate initial BWP configurations, such as a separate initial downlink BWP in addition to the default initial BWP, a separate initial uplink BWP that can have a different location and bandwidth than an initial BWP for UEs that support only a previous generation RAT, or combinations thereof. In cases where separate initial downlink and/or uplink BWPs are configured, center frequencies of the BWPs may be unaligned with the center frequency of the default initial BWPs. In some cases, a UE of one RAT (e.g., 6G UE) may have a BWP switch for the initial BWP that may be triggered by downlink control information (DCI), a medium access control (MAC) control element (CE), or timer, which may be performed when the UE is in an idle state. In some cases, additionally or alternatively, a UE of one RAT may request activation of a downlink reference signal (e.g., SSB, tracking reference signal (TRS), positioning reference signal (PRS)) in the initial downlink BWP. For example, a UE may perform a BWP switch from a first initial downlink BWP to a second initial downlink BWP configured for the first RAT, and may determine that the second initial downlink BWP does not include CD-SSB. In such a case, the UE may request activation of an on-demand downlink reference signal in the second initial downlink BWP. Further, the request of UE may or may not be granted by the network and, if the request is granted, the UE may monitor the on-demand downlink reference signal on the second initial downlink BWP. However, if the request is declined by the network, there will not be a downlink reference signal transmitted on the second initial downlink BWP, and the UE may switch to the first initial downlink BWP to monitor CD-SSB.

Additionally, or alternatively, a UE of one RAT (e.g., a MRSS-capable 6G UE) may perform early measurements on candidate frequencies of an initial BWP (e.g., on candidate frequencies for carrier aggregation (CA), dual connectivity (DC), or MRSS), and report the early measurements on the MRSS cell by initiating a random access or small data transmission (SDT) procedure (e.g., a mobile-originated SDT (MO-SDT)). Such a UE may be provided with a list of candidate cells, candidate carrier frequencies, or both, for early measurement reporting (e.g., by radio resource control (RRC) signaling, system information (SI), multicast and broadcast services (MBS), or any combinations thereof) before or after releasing an RRC connection. After releasing the RRC connection, an MRSS-capable UE may be provided with updated information for early measurements and reporting when the random access or SDT procedure is ongoing, or when the UE is monitoring a multicast control channel (MCCH), multicast traffic channel (MTCH), or short message communications.

Techniques such as discussed herein may provide for enhanced network access for different RATs through efficient use of common wireless resources for each different RAT. UEs of different RATs may monitor an initial BWP for network access information, and perform network access operations (e.g., random access procedures) based on network access information provided in the common wireless resources (e.g., an initial BWP that provides a CD-SSB). Such techniques may enhance the efficiency of wireless resource usage through flexible communication of network access information for multiple RATs that may be received at different UEs that use different RATs. Accordingly, such techniques enhance network efficiency and reliability, and provide for enhanced user experience.

Aspects of the disclosure are initially described in the context of wireless communications systems. Aspects of the disclosure are further illustrated by and described with reference to different BWP configurations for MRSS cells and cell access, apparatus diagrams, system diagrams, and flowcharts that relate to techniques for accessing multiple radio access technology spectrum sharing.

FIG. 1 shows an example of a wireless communications system 100 that supports techniques for accessing multiple radio access technology spectrum sharing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for accessing multiple radio access technology spectrum sharing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some aspects, two or more RATs may be provided by one or more of the network entities 105. In some cases, MRSS may be provided and a MRSS cell may provide common resources for network access information for each of two or more RATs. In some aspects, an initial BWP configuration may be provided for a MRSS cell, and UEs 115 supporting MRSS (e.g., 5G or 6G UEs), as well as UEs 115 that support only one RAT (e.g., a legacy UE that supports an older technology RAT, such as a 5G RAT), may operate on the initial BWP and monitor for network access information in the common resources. For example, two or more RATs may share one or more synchronization signal blocks (SSBs), such as a cell-defining SSB (CD-SSB), non-cell-defining SSB (NCD-SSB), and a default initial downlink BWP (e.g., for control resource set (CORESET) #0 that is indicated by a master information block (MIB) of a CD-SSB).

In some cases, MRSS cells may have separate initial BWP configurations, such as a separate initial downlink BWP in addition to the default initial BWP, a separate initial uplink BWP that can have a different location and bandwidth than an initial BWP for UEs 115 that support only a previous generation RAT, or combinations thereof. In cases where separate initial downlink and/or uplink BWPs are configured, center frequencies of the BWPs may be unaligned with the center frequency of the default initial BWPs. In some cases, a UE 115 of one RAT (e.g., 6G UE) may have a BWP switch for the initial BWP that may be triggered by DCI, a MAC-CE, or timer, which may be performed when the UE 115 is in an idle state. In some cases, additionally or alternatively, a UE 115 of one RAT may request activation of a downlink reference signal (e.g., SSB, TRS, PRS) in the separate initial downlink BWP and, in the event that the request is not granted, may monitor the original initial downlink BWP for a CD-SSB.

Additionally, or alternatively, a UE 115 of one RAT (e.g., a MRSS-capable 6G UE) may perform early measurements on candidate frequencies of an initial BWP (e.g., on candidate frequencies for CA, DC, or MRSS), and report the early measurements on the MRSS cell by initiating a random access or SDT procedure (e.g., a mobile originated (MO) SDT). Such a UE may be provided with a list of candidate cells, candidate carrier frequencies, or both, for early measurement reporting (e.g., by RRC signaling. SI, MBS, or any combinations thereof) before or after releasing an RRC connection. After releasing the RRC connection, an MRSS-capable UE 115 may be provided with updated information for early measurements and reporting when the random access or SDT procedure is ongoing, or when the UE 115 is monitoring a MCCH, MTCH, or short message communications.

Figure 2:
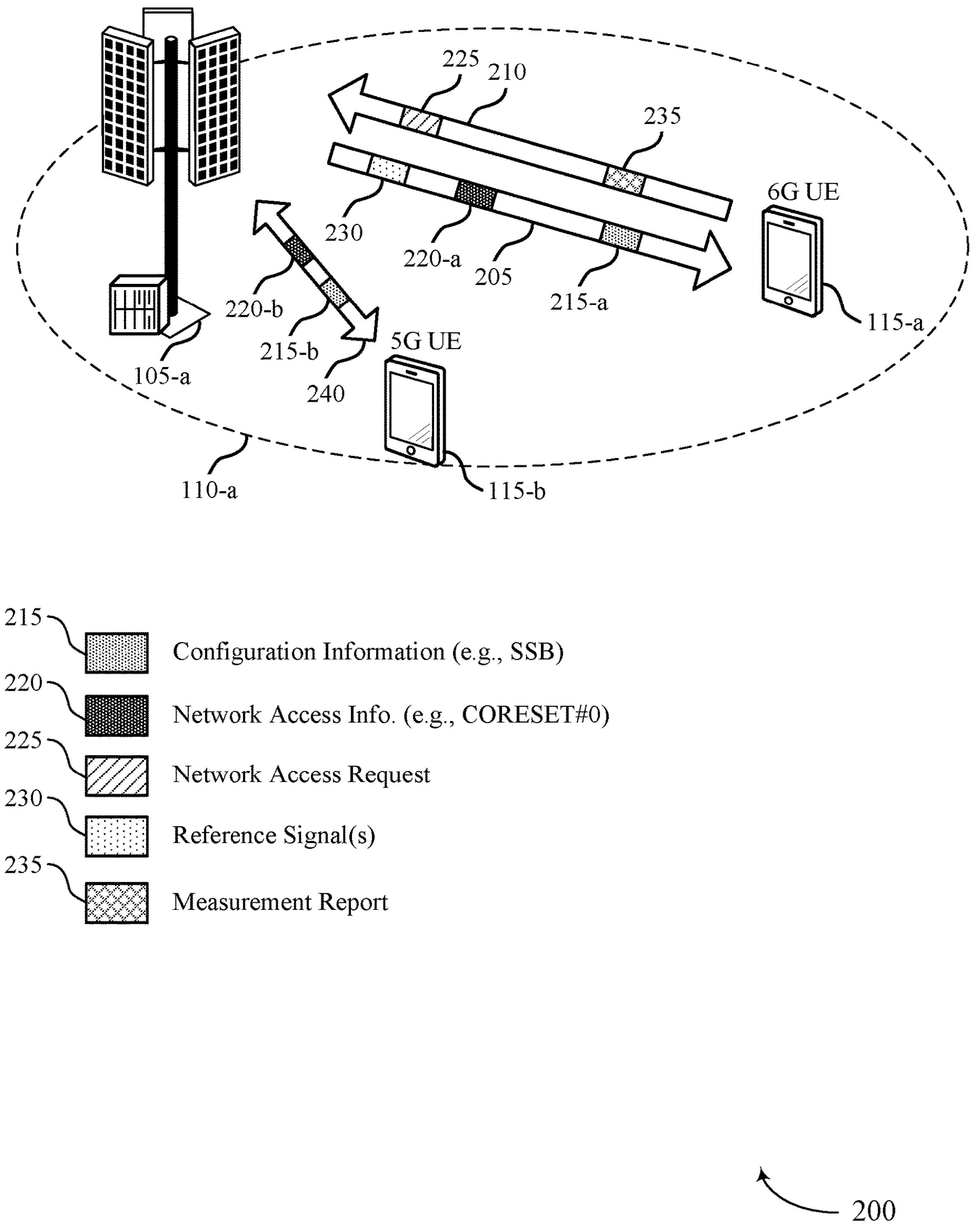
FIG. 2 shows an example of a portion of a wireless communications system that supports techniques for accessing multiple radio access technology spectrum sharing in accordance with one or more aspects of the present disclosure.

FIG. 2 shows an example of a wireless communications system 200 that supports techniques for accessing multiple radio access technology spectrum sharing in accordance with one or more aspects of the present disclosure. In some examples, the wireless communications system 200 may implement aspects of a wireless communications system 100. For example, the wireless communications system 200 may include a network entity 105-*a*, a first UE 115-*a*, and a second UE 115-*b* which may be examples of corresponding devices as described with reference to FIG. 1, located in an associated coverage area 110-*a*.

In some examples, the network entity 105-*a* (e.g., a network entity 105 of FIG. 1) may communicate with the first UE 115-*a* via downlink channel 205 and uplink channel 210. For example, downlink channel 205 and uplink channel 210 may be carried by downlink and uplink component carriers, or may be provided using TDD on one or more component carriers. In some cases, the first UE 115-*a* and the network entity 105-*a* may communicate using a first RAT (e.g., a 6G RAT). The network entity 105-*a* also may communicate with the second UE 115-*b* via communications link 240, which may include one or more downlink carriers, one or more uplink carriers, one or more TDD carriers, etc.). In some cases, the second UE 115-*b* and the network entity 105-*a* may communicate using a second RAT (e.g., a 5G RAT).

In accordance with various techniques herein, the network entity 105-*a* may transmit configuration information 215 that indicates an initial downlink bandwidth part to monitor for network access control signaling. In some cases, the configuration information 215 may be transmitted via a same set of wireless resources that are common across the downlink channel 205 and the communications link 240 such that the first UE 115-*a* may receive configuration information 215-*a* and the second UE 115-*b* may receive configuration information 215-*b*. In some cases, the configuration information 215 may be provided in a SSB that is transmitted via the initial downlink BWP. For example, the first UE 115-*a* and the second UE 115-*b* may monitor the initial BWP (e.g., BWP with index zero, or BWP #0), and during initial access, the UEs 115 may perform cell searches based on the SSB (e.g., a CD-SSB or non-CD-SSB). The SSB may include a primary synchronization signal (PSS), a secondary synchronization signal (SSS), and a physical broadcast channel (PBCH).

To access the system, the UEs 115 may further read network access information 220 (e.g., first UE 115-*a* may read network access information 220-*a* and second UE 115-*b* may read network access information 220-*b*), which may be provided, for example, using a CORESET (e.g., CORESET #0) and a system information block (SIB), such as SIB1, which may provide information including the initial DL/UL BWP configuration. In some cases, SIB1 may be is transmitted on a physical downlink shared channel (PDSCH), which is scheduled by downlink control information (DCI) on a physical downlink control channel (PDCCH) using the CORESET (e.g., CORESET #0). In some cases, based on the SIB1, the first UE 115-*a* may follow a DL/UL BWP configuration that is indicated in SIB1 to perform a random-access procedure to transmit a network access request 225 to request the setup of an RRC connection using the first RAT. The second UE 115-*b* may perform similar procedures that are associated with the second RAT.

Additionally, or alternatively, in some aspects the first UE 115-*a* may monitor for one or more reference signals 230 that are transmitted by the network entity 105-*a*, and may transmit a measurement report 235 based on the measurements. In some cases, the reference signals 230 may be transmitted responsive to a request from the first UE 115-*a*, or may be transmitted on one or more candidate frequencies that are configured for early measurement reporting.

Figure 3:
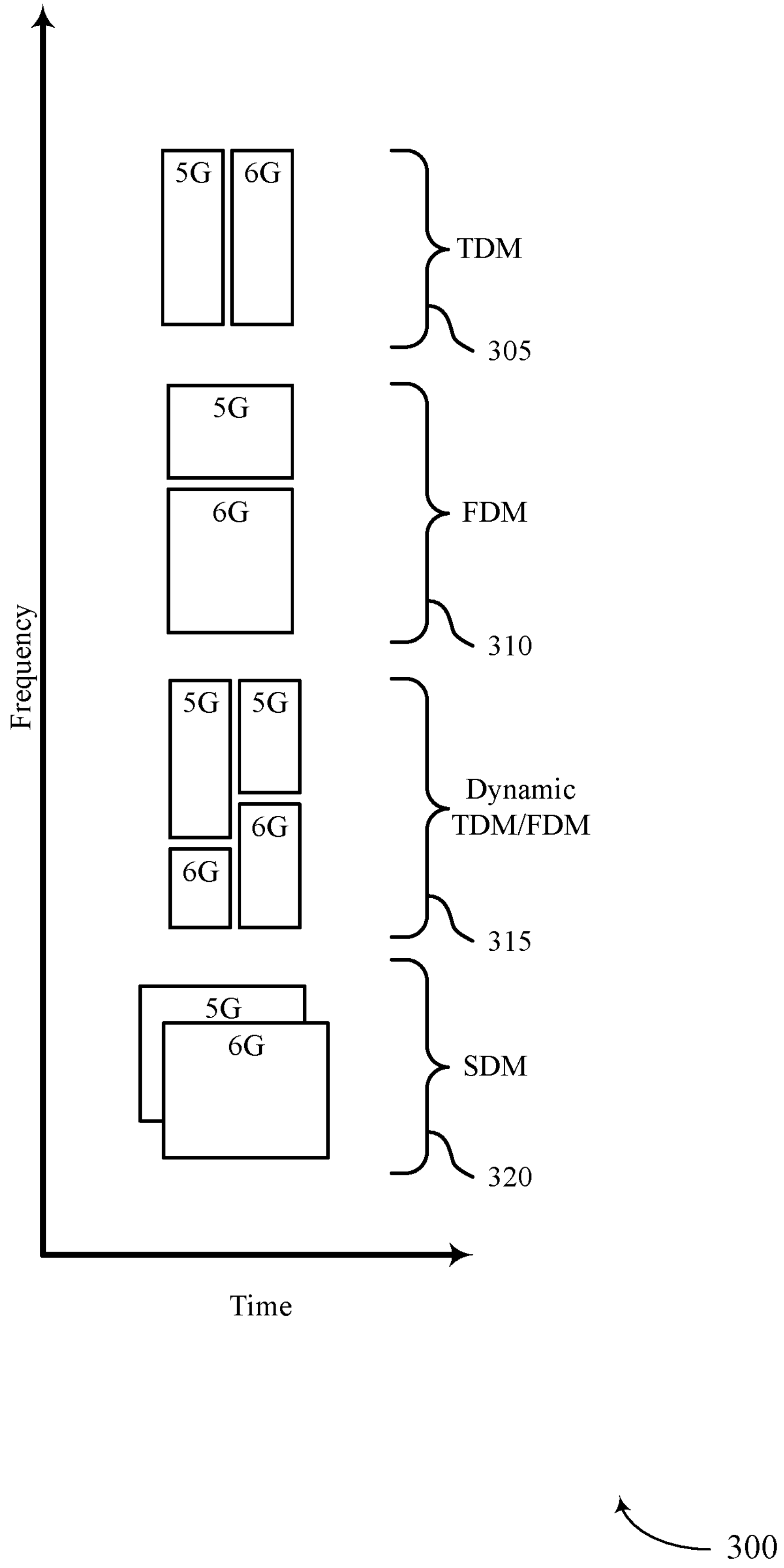
FIG. 3 shows examples of spectrum sharing techniques for accessing multiple radio access technology spectrum sharing in accordance with one or more aspects of the present disclosure.

In some cases, the network entity 105-*a* may provide a MRSS cell that uses the initial BWP to provide configuration information for the MRSS cell. Such MRSS may allow two or more RATs to use a common set of wireless resources for at least some communications. For example, a 6G RAT may use the MRSS cell to provide a low-band anchor cell that may be used to support higher band communications. FIG. 3 provides some examples of spectrum sharing for such a MRSS cell.

FIG. 3 shows examples of spectrum sharing techniques 300 that support multiple radio access technology spectrum sharing in accordance with one or more aspects of the present disclosure. In some examples, the spectrum sharing techniques 300 may be implemented in aspects of a wireless communications system 100 or 200 as described with reference to FIGS. 1 and 2.

In the example of FIG. 3, frequency and time resources are illustrated, and in a first example 305 time division multiplexing (TDM) may be used to provide separate time resources for each RAT (e.g., a 5G RAT and a 6G RAT in this example) that use the same frequency resources. In a second example 310, frequency division multiplexing (FDM) may be used to provide separate frequency resources for each RAT with the same time resources. In a third example 315, dynamic TDM/FDM may be used in which different time instances may have different frequency resource allocations for each RAT (e.g., that may be signaled for each time interval of a multiple time intervals). In a fourth example, 320, spatial division multiplexing (SDM) may be used to provide concurrent communications for each RAT. In some cases, the information related to multiplexing and resources associated with reach RAT may be provided after initial access, where the network access parameters for the initial access procedure is provided, at least in part, in an initial BWP that is used to provide common configuration information for each RAT, as discussed in various aspects herein. In some cases, a network entity may provide a MRSS cell that uses the initial BWP to provide a CD-SSB via a default initial downlink BWP. In some cases, an MRSS cell can be configured on paired spectrum, unpaired spectrum, or sub-band full duplex (SBFD) bands. UEs supporting MRSS (e.g., 5G and 6G UEs) and legacy UEs (e.g., 5G UEs) can share the CD-SSB, NCD-SSB, and the default initial DL BWP (e.g., CORESET #0 configured by MIB of CD-SSB).

In some cases, a separate initial BWP configuration on an MRSS cell may be provided for a RAT. For example, in addition to the default initial downlink BWP shared among two or more RATs, an MRSS-capable UE may be separately configured with an initial downlink BWP, whose location and/or BW can be different from the default initial downlink BWP. In another example, an MRSS-capable UE may be separately configured with an initial uplink BWP, whose location and bandwidth can be different from the initial uplink BWP of a non-MRSS capable UE. Additionally, or alternatively, physical random access channel (PRACH) and physical uplink control channel (PUCCH) resources for an MRSS-capable UE can be separately configured and/or shared with non-MRSS capable UEs. In some cases, if an initial downlink BWP is separately configured for an MRSS-capable UE on a MRSS cell, the initial downlink BWP is not required to be aligned at center frequency with the initial uplink BWP of an MRSS-capable UE, or the initial uplink BWP of a non-MRSS capable UE, or the default initial downlink BWP. Similarly, in some cases, if an initial uplink BWP is separately configured for an MRSS-capable UE on MRSS cell, the initial uplink BWP is not required to be aligned at center frequency with the initial downlink BWP of an MRSS-capable UE, or the initial uplink BWP of a non-MRSS capable UE, or the default initial downlink BWP. FIGS. 4 through 7 provide several examples of uplink/downlink BWP configurations that may be implemented in accordance with various techniques as discussed herein.

Figure 4:
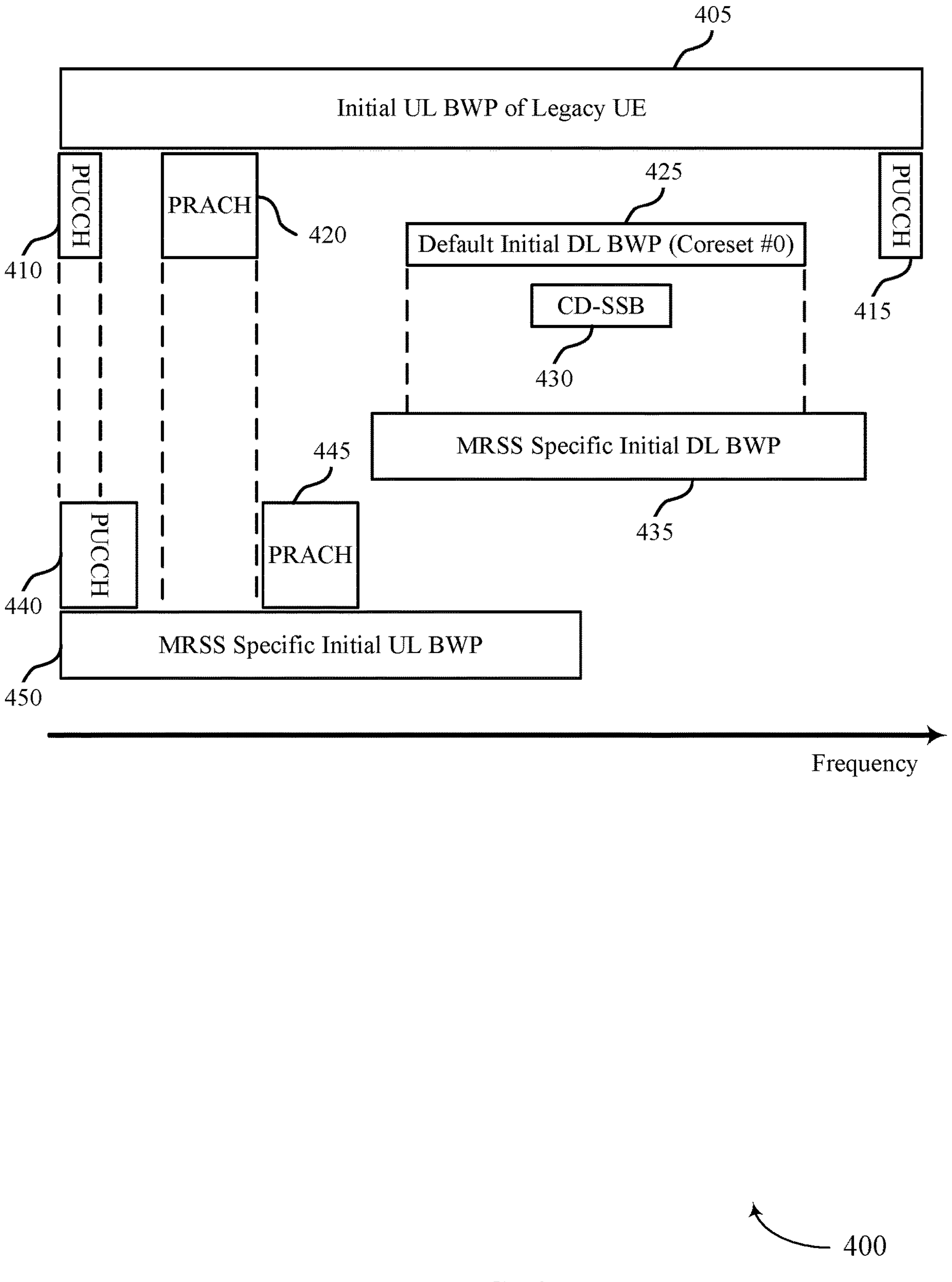
FIGS. 4 through 7 show examples of BWP configurations for MRSS cells that supports techniques for accessing multiple radio access technology spectrum sharing in accordance with one or more aspects of the present disclosure.

FIG. 4 shows an example of a BWP configuration 400 for a MRSS cell that supports techniques for accessing multiple radio access technology spectrum sharing in accordance with one or more aspects of the present disclosure. In some examples, the BWP configuration 400 for the MRSS cell may be implemented in aspects of a wireless communications system 100 or 200 as described with reference to FIGS. 1 and 2.

In this example, an initial uplink BWP 405 of a legacy UE (e.g., a non-MRSS UE) may span a set of frequency resources. Included in the BWP are frequency resources for PUCCHs 410 and 415, PRACH 420, and a default initial downlink BWP 425 (e.g., CORESET #0) that may include resources for CD-SSB 430. In this example, a MRSS-specific initial downlink BWP 435 may include frequency resources of the default initial downlink BWP 425, and MRSS-specific PUCCH 440 and PRACH 445 resources may be included within a MRSS-specific initial uplink BWP 450. In this example, as can be observed by the illustration in FIG. 4, the MRSS-specific initial uplink BWP 450 is not aligned with the center frequency of the default initial downlink BWP 425 or the MRSS-specific initial downlink BWP 435. Further, in this example, the MRSS-specific PUCCH 440 shares resources with non-MRSS specific PUCCH 410 and also includes additional frequency resources. The MRSS-specific PRACH resources are non-overlapping with the PRACH 420 resources of for non-MRSS specific UEs.

Figure 5:
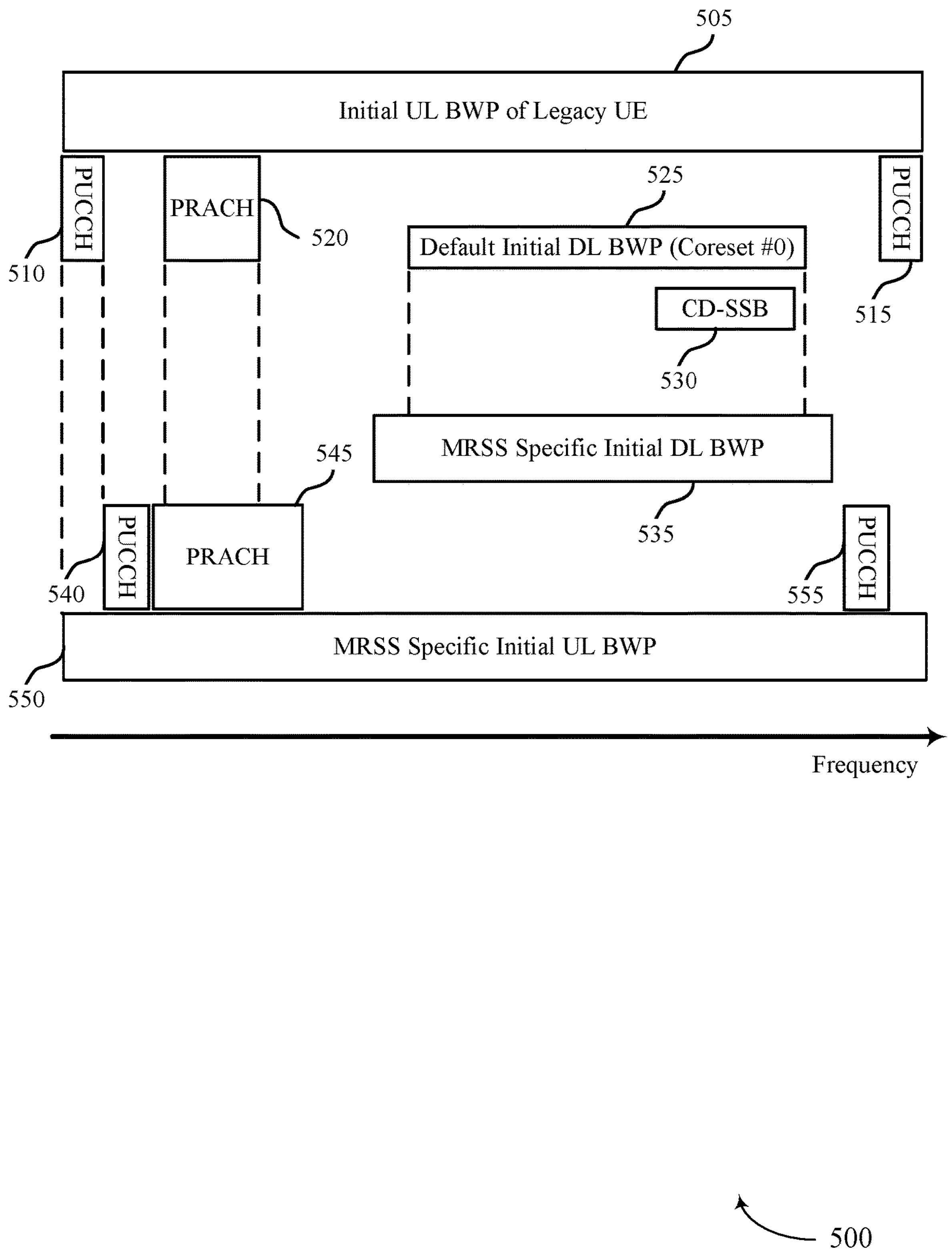

FIG. 5 shows another example of a BWP configuration 500 for a MRSS cell that supports techniques for accessing multiple radio access technology spectrum sharing in accordance with one or more aspects of the present disclosure. In some examples, the BWP configuration 500 for the MRSS cell may be implemented in aspects of a wireless communications system 100 or 200 as described with reference to FIGS. 1 and 2.

In this example, similarly as the example of FIG. 4, an initial uplink BWP 505 of a legacy UE (e.g., a non-MRSS UE) may span a set of frequency resources. Included in the BWP are frequency resources for PUCCHs 510 and 515, PRACH 520, and a default initial downlink BWP 525 (e.g., CORESET #0) that may include resources for CD-SSB 530. In this example, a MRSS-specific initial downlink BWP 535 may include frequency resources of the default initial downlink BWP 525, and MRSS-specific PUCCH 540, 555 and PRACH 545 resources may be included within a MRSS-specific initial uplink BWP 550. In this example, as can be observed by the illustration in FIG. 5, the MRSS-specific initial uplink BWP 550 corresponds to the initial uplink BWP 505. Further, in this example, the MRSS-specific PUCCH 540, 555 are non-overlapping with non-MRSS specific PUCCH 510 and 515. Additionally, the MRSS-specific PRACH resources are overlapping with the PRACH 520 resources of for non-MRSS specific UEs.

Figure 6:
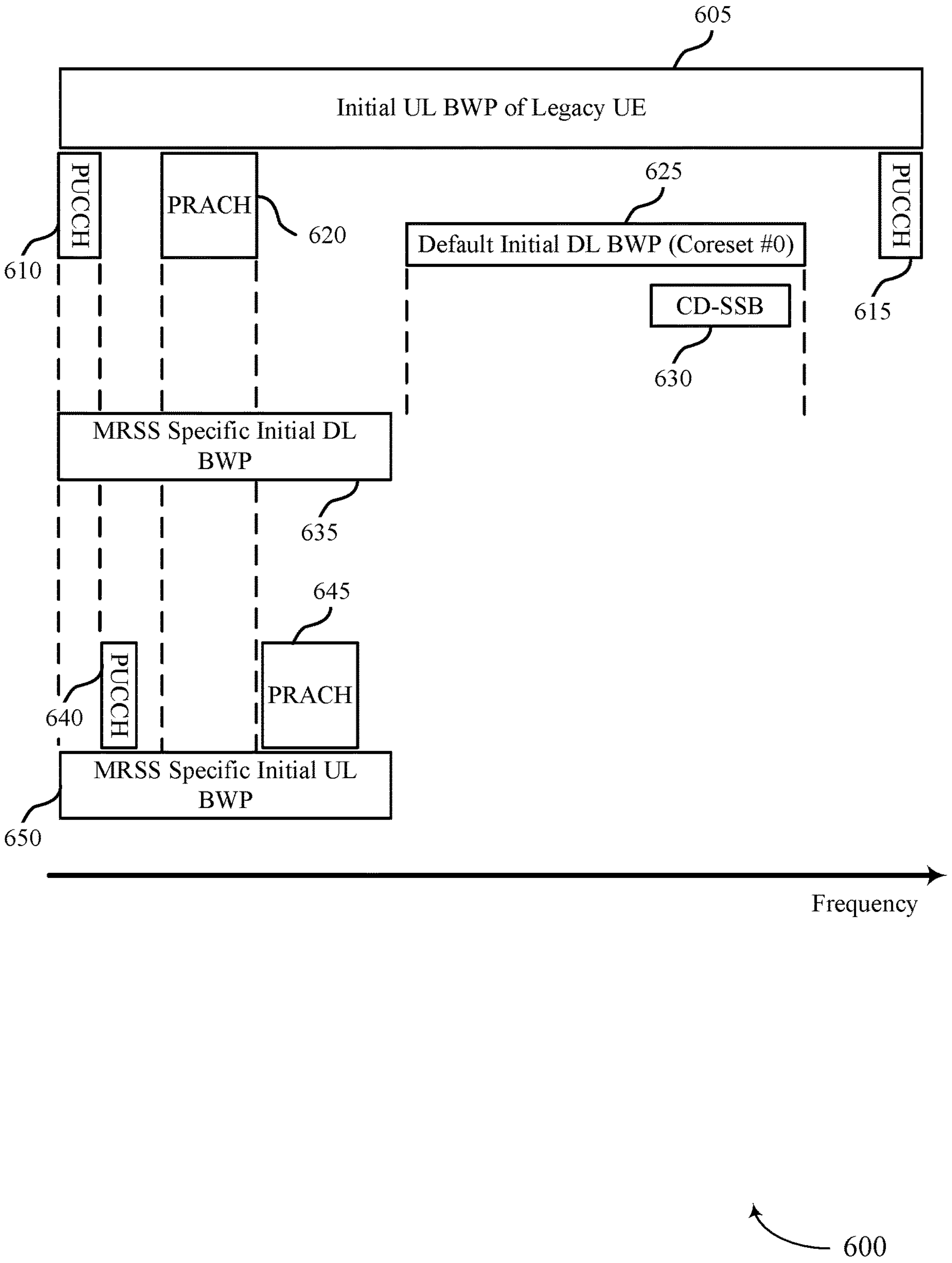

FIG. 6 shows another example of a BWP configuration 600 for a MRSS cell that supports techniques for accessing multiple radio access technology spectrum sharing in accordance with one or more aspects of the present disclosure. In some examples, the BWP configuration 600 for the MRSS cell may be implemented in aspects of a wireless communications system 100 or 200 as described with reference to FIGS. 1 and 2.

In this example, similarly as the example of FIGS. 4 and 5, an initial uplink BWP 605 of a legacy UE (e.g., a non-MRSS UE) may span a set of frequency resources. Included in the BWP are frequency resources for PUCCHs 610 and 615, PRACH 620, and a default initial downlink BWP 625 (e.g., CORESET #0) that may include resources for CD-SSB 630. In this example, a MRSS-specific initial downlink BWP 635 may include non-overlapping frequency resources with the default initial downlink BWP 625, and MRSS-specific PUCCH 640 and PRACH 645 resources may be included within a MRSS-specific initial uplink BWP 650. In this example, as can be observed by the illustration in FIG. 6, the MRSS-specific initial uplink BWP 650 corresponds to the MRSS-specific initial downlink BWP 635. Further, in this example, the MRSS-specific PUCCH 640 and PRACH 645 are non-overlapping with non-MRSS specific PUCCH 610 and PRACH 620.

Figure 7:
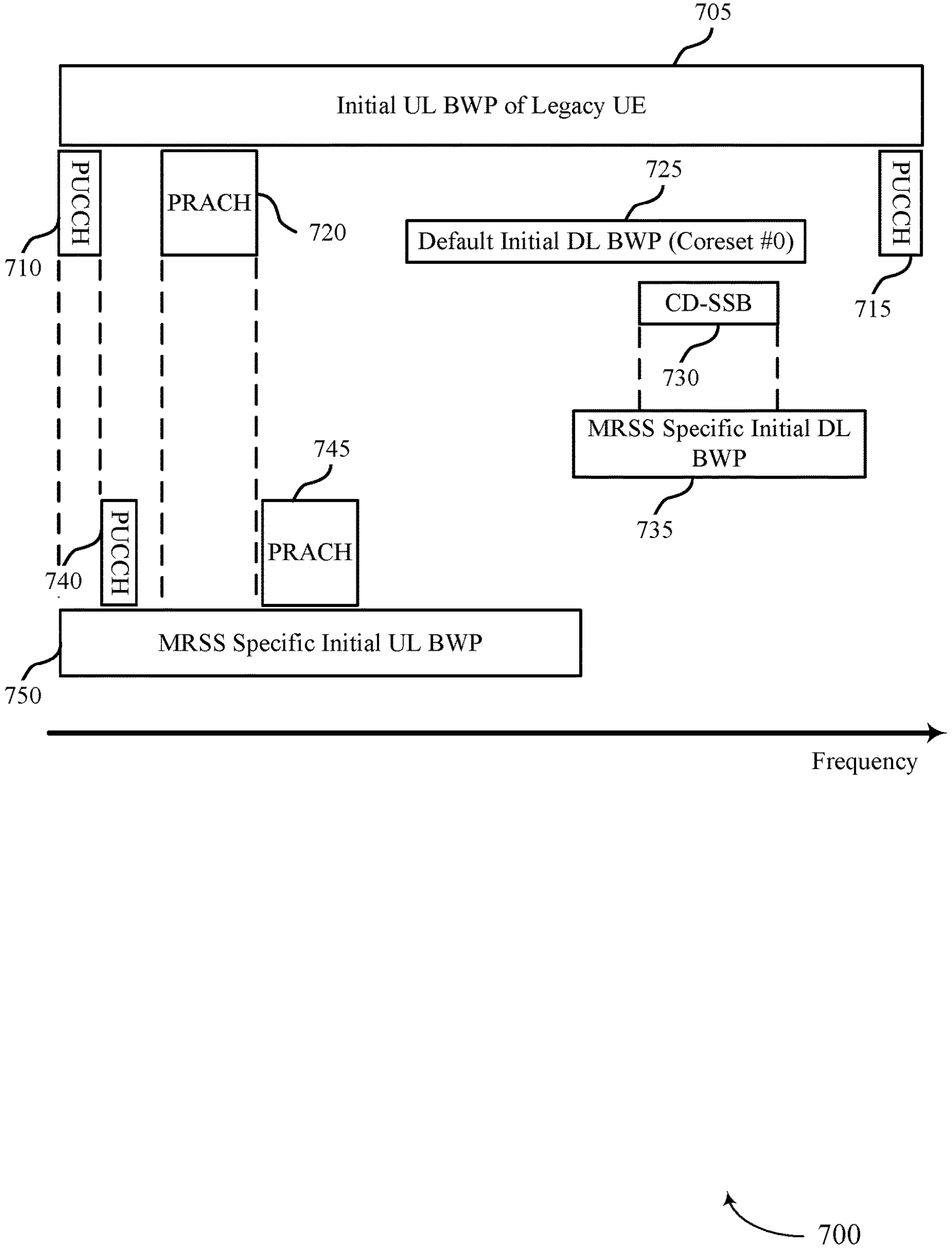

FIG. 7 shows another example of a BWP configuration 700 for a MRSS cell that supports techniques for accessing multiple radio access technology spectrum sharing in accordance with one or more aspects of the present disclosure. In some examples, the BWP configuration 700 for the MRSS cell may be implemented in aspects of a wireless communications system 100 or 200 as described with reference to FIGS. 1 and 2.

In this example, similarly as the example of FIGS. 4 through 6, an initial uplink BWP 705 of a legacy UE (e.g., a non-MRSS UE) may span a set of frequency resources. Included in the BWP are frequency resources for PUCCHs 710 and 715, PRACH 720, and a default initial downlink BWP 725 (e.g., CORESET #0) that may include resources for CD-SSB 730. In this example, a MRSS-specific initial downlink BWP 735 may include partially overlapping frequency resources with the default initial downlink BWP 725, and MRSS-specific PUCCH 740 and PRACH 745 resources may be included within a MRSS-specific initial uplink BWP 750. In this example, as can be observed by the illustration in FIG. 7, the MRSS-specific initial uplink BWP 750 has a different center frequency than, and partially overlaps with, the MRSS-specific initial downlink BWP 735. Further, in this example, the MRSS-specific PUCCH 740 and PRACH 745 are non-overlapping with non-MRSS specific PUCCH 710 and PRACH 720.

Figure 8:
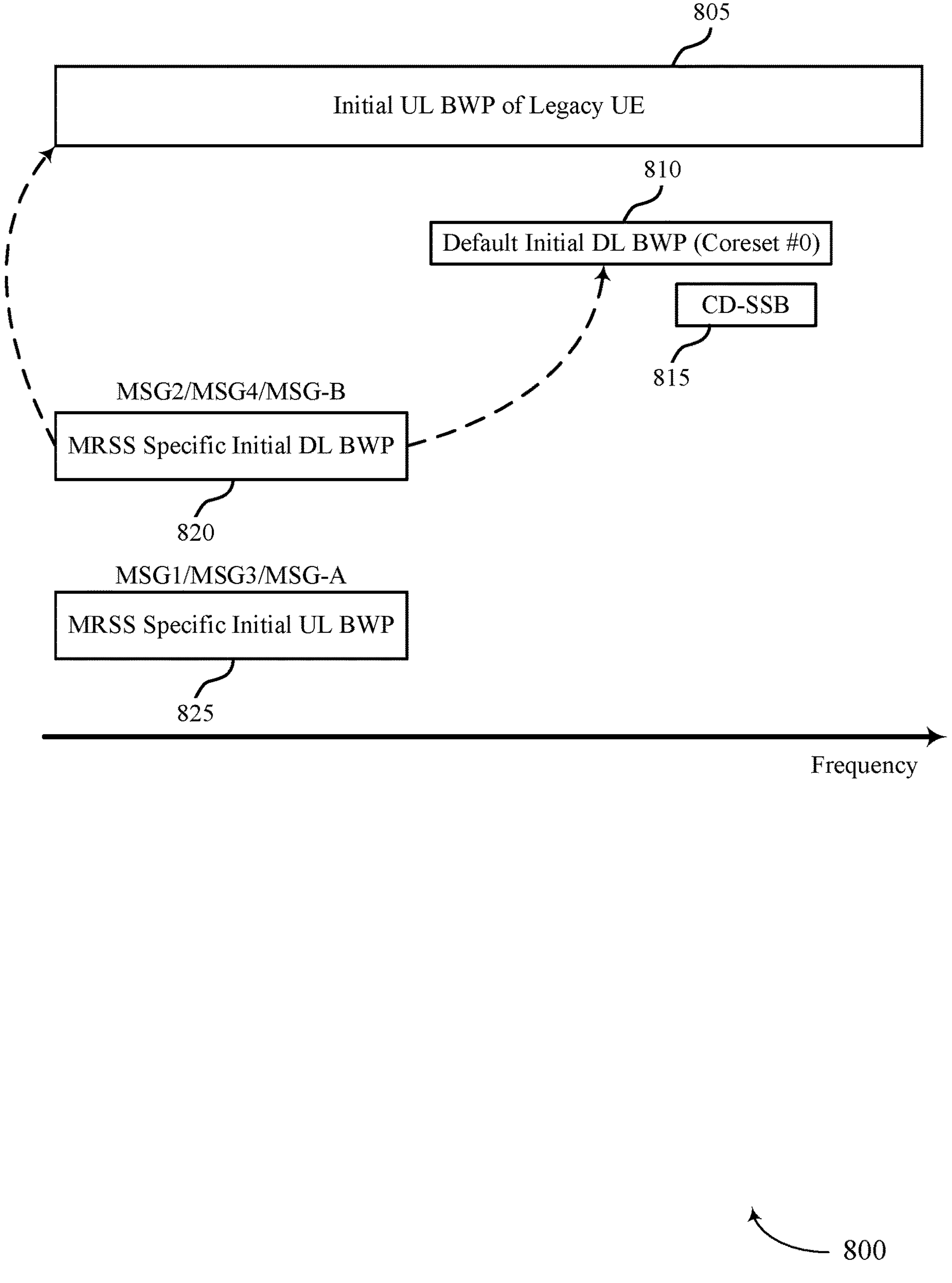
FIG. 8 shows an example of BWP switching that supports techniques for accessing multiple radio access technology spectrum sharing in accordance with one or more aspects of the present disclosure.

FIG. 8 shows an example of a BWP switching 800 that supports techniques for accessing multiple radio access technology spectrum sharing in accordance with one or more aspects of the present disclosure. In some examples, the BWP switching 800 may be implemented in aspects of a wireless communications system 100 or 200 as described with reference to FIGS. 1 and 2.

In some examples, a MRSS-capable UE may perform bandwidth switching of the initial BWP. Such switching may provide for enhanced flexibility for initial access communications for a RAT associated with the MRSS-capable UE. In some cases, an initial uplink BWP 805 of a legacy UE (e.g., a non-MRSS UE) may span a set of frequency resources. Included in the BWP are frequency resources for a default initial downlink BWP 810 (e.g., CORESET #0) that may include resources for CD-SSB 815. In this example, a MRSS-capable UE may be signaled to switch an initial BWP to MRSS-specific initial downlink BWP 820, and to MRSS-specific initial uplink BWP 825. In some cases, initial BWP switching may be based on one or more of signaling provided in DCI or a MAC-CE, or based on a timer. In some cases, switching may be indicated while the UE is in an idle or inactive state. In some cases, one or more DCI format(s), MAC-CE(s), timer(s), or any combinations thereof, may be specified for the MRSS-capable UE to facilitate BWP switching in idle/inactive state. For example, overhead reduction for a system information (SI) transmission may be achieved in which an MRSS-capable UE requests SI by sending msg1/msg3/msgA using the MRSS-specific initial uplink BWP 825, and monitoring msg2/msg4/msgB in the MRSS-specific initial downlink BWP 820 without a common search space (CSS) set for monitoring the SI. A network entity may respond to the UE request and indicate that the UE is switch to the default initial downlink BWP 810 to receive on-demand SI.

Further, BWP switching between the initial uplink BWP 805 and the MRSS-specific initial uplink BWP 825 may be supported by an MRSS-capable UE in idle/inactive state. For example, for mitigation of PUCCH resource blocking, an MRSS-capable UE may transmit msg3/msgA in the MRSS-specific initial uplink BWP 825 and receive msg4/msgB in the MRSS-specific initial downlink BWP 820, which may indicate the UE is to switch to the default initial uplink BWP 805 to transmit acknowledgment feedback (e.g., HARQ-ACK feedback).

In some cases, BWP switching for uplink and downlink BWPs may be decoupled. For example, when an MRSS-capable UE switches its initial downlink (or uplink) BWP on an MRSS cell, it is not required to switch the initial uplink (or downlink) BWP autonomously. In some aspects, whether or not the initial downlink (or uplink) BWP switching is coupled with the initial uplink (or downlink) BWP switching may be indicated by the network entity in SI, RRC signaling, a MAC-CE, or DCI.

In some further aspects, a UE may request on-demand reference signal activation. In some cases, when an MRSS-capable UE is operating on an initial downlink BWP (e.g., for random access (RA) or SDT) and the initial DL BWP is not configured with a downlink reference signal (e.g., for synchronization, positioning, sensing using SSB, TRS, PRS), the UE may request for a downlink reference signal transmission/activation in the initial downlink BWP when the RA or SDT procedure is ongoing. In some cases, the UE may transmit an explicit or implicit request in PRACH, PUSCH, or PUCCH. In some cases, the UE may transmit a report based on the received reference signals in PUSCH (e.g., msgA payload, msg3, configured grant (CG)-PUSCH, or PUSCH transmission in RA-SDT after contention resolution). Upon receiving UE request for a downlink reference signal, the network entity may either grant the UE request and transmit one or more reference signals in the initial downlink BWP, or switch the UE to another BWP configured with downlink reference signals, or provide a downlink reference signal configurations on another cell sharing the same timing reference with the MRSS cell. In some case, the network response to the UE request may be transmitted in DCI, a MAC-CE, RRC signaling, a MCCH, a MTCH, or any combinations thereof.

Additionally, or alternatively, in some aspects a UE may be configured to provide idle mode measurement reporting. In some aspects, when an MRSS-capable UE camps on an MRSS cell, it can perform early measurements on candidate frequencies of CA. DC, MRSS, or any combinations thereof, and report the early measurements on the MRSS cell by initiating a RA or MO-SDT procedure. In some cases, the UE may be provided with a list of candidate cells, carrier frequencies, or both, for early measurement reporting (e.g., via RRC. SI, MBS, or any combinations thereof) before or after releasing a RRC connection. In some cases, after releasing the RRC connection, an MRSS-capable UE may be provided with updated information for early measurements and reporting when the RA or SDT (e.g., mobile originated or mobile terminated SDT) procedure is ongoing, or when the UE is monitoring MCCH, MTCH, or short message communications. Such idle mode measurements may provide for more reliable communications when the UE comes out of idle mode, for example.

Figure 9:
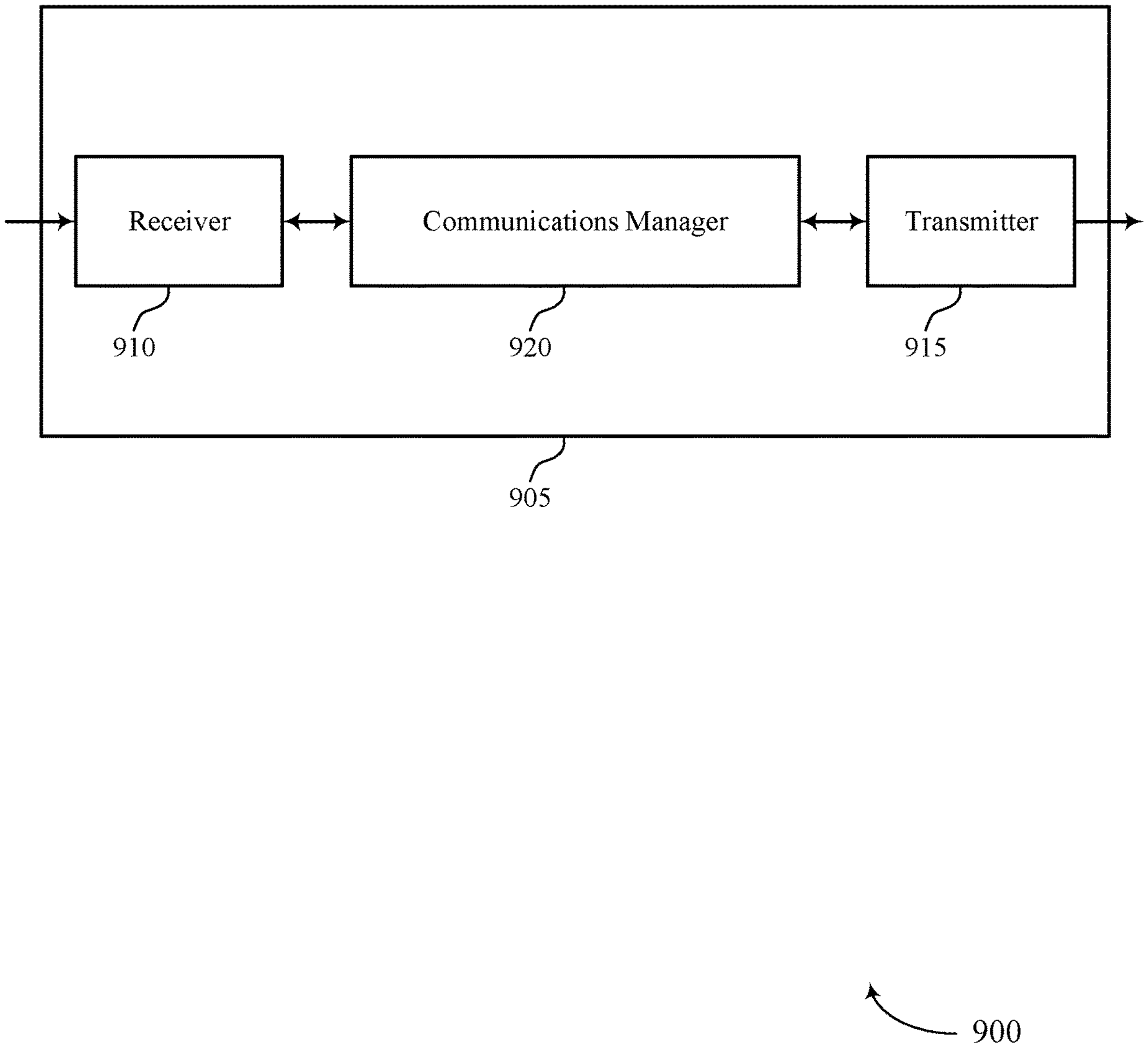
FIGS. 9 and 10 show block diagrams of devices that support techniques for accessing multiple radio access technology spectrum sharing in accordance with one or more aspects of the present disclosure.

FIG. 9 shows a block diagram 900 of a device 905 that supports techniques for accessing multiple radio access technology spectrum sharing in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for accessing multiple radio access technology spectrum sharing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for accessing multiple radio access technology spectrum sharing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for accessing multiple radio access technology spectrum sharing as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 is capable of, configured to, or operable to support a means for receiving configuration information that indicates a first initial downlink bandwidth part (BWP) to monitor for network access control signaling, where a first radio access technology and a second radio access technology share a set of wireless resources that are configured within the first initial downlink BWP. The communications manager 920 is capable of, configured to, or operable to support a means for operating on the first initial downlink BWP and monitoring the network access control signaling that includes network access information for both the first radio access technology and the second radio access technology. The communications manager 920 is capable of, configured to, or operable to support a means for transmitting a network access request using the first radio access technology based on the network access information from the network access control signaling.

Additionally, or alternatively, the communications manager 920 may support wireless communications at a UE in accordance with examples as disclosed herein. For example, the communications manager 920 is capable of, configured to, or operable to support a means for receiving a set of candidate frequencies for one or more measurements associated with a first initial downlink bandwidth part (BWP) that is used for wireless communications of both a first radio access technology and a second radio access technology. The communications manager 920 is capable of, configured to, or operable to support a means for measuring one or more channel parameters associated with one or more candidate frequencies of the set of candidate frequencies. The communications manager 920 is capable of, configured to, or operable to support a means for transmitting a measurement report of the one or more channel parameters in a network access request using the first radio access technology or in a small data transmission using the first radio access technology.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for network access for different RATs through efficient use of common wireless resources for each different RAT, which may enhance the efficiency of wireless resource usage through flexible communication of network access information for multiple RATs that may be received at different UEs that use different RATs.

Figure 10:
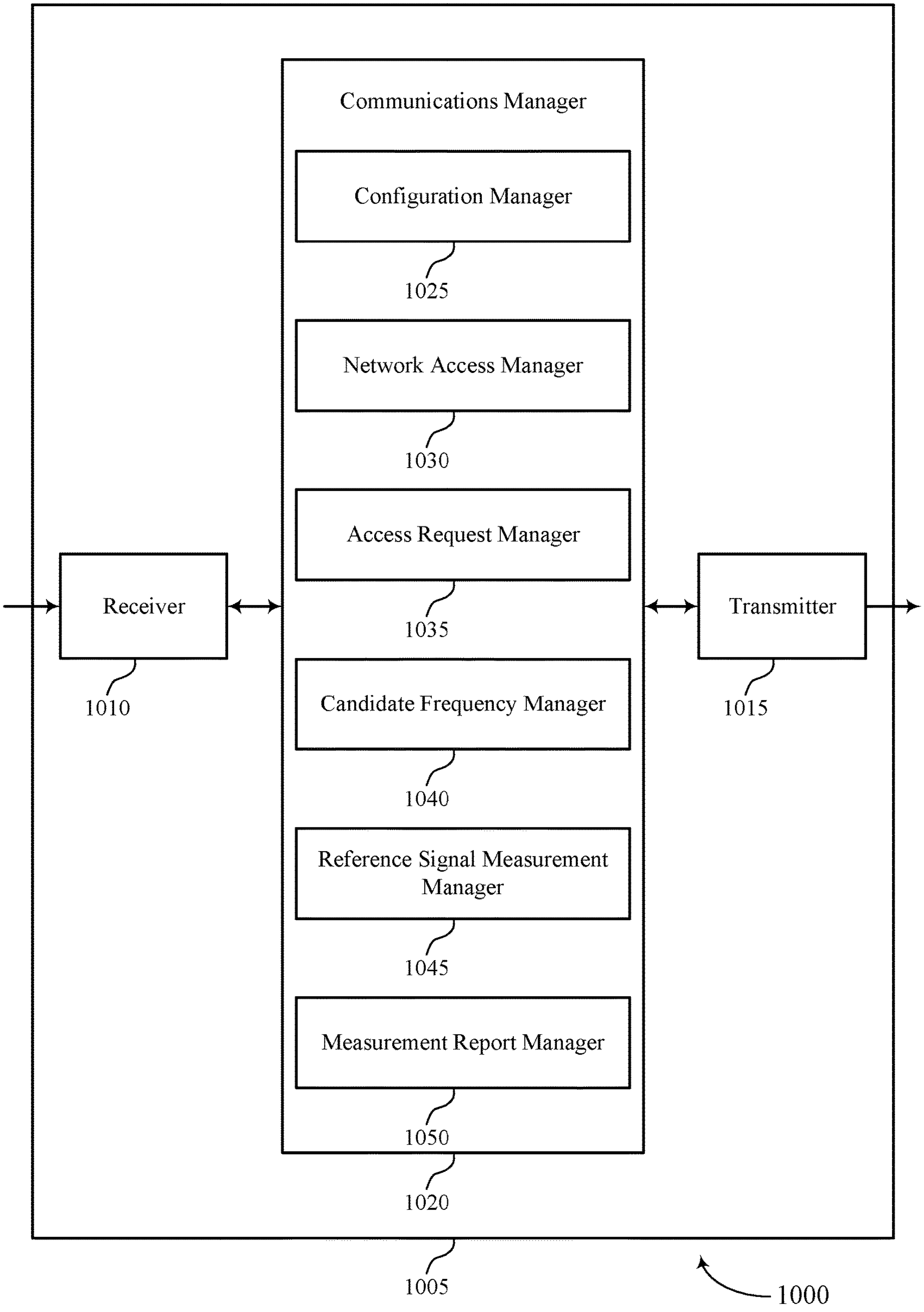

FIG. 10 shows a block diagram 1000 of a device 1005 that supports techniques for accessing multiple radio access technology spectrum sharing in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for accessing multiple radio access technology spectrum sharing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for accessing multiple radio access technology spectrum sharing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for accessing multiple radio access technology spectrum sharing as described herein. For example, the communications manager 1020 may include a configuration manager 1025, a network access manager 1030, an access request manager 1035, a candidate frequency manager 1040, a reference signal measurement manager 1045, a measurement report manager 1050, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The configuration manager 1025 is capable of, configured to, or operable to support a means for receiving configuration information that indicates a first initial downlink bandwidth part (BWP) to monitor for network access control signaling, where a first radio access technology and a second radio access technology share a set of wireless resources that are configured within the first initial downlink BWP. The network access manager 1030 is capable of, configured to, or operable to support a means for operating on the first initial downlink BWP and monitoring the network access control signaling that includes network access information for both the first radio access technology and the second radio access technology. The access request manager 1035 is capable of, configured to, or operable to support a means for transmitting a network access request using the first radio access technology based on the network access information from the network access control signaling.

Additionally, or alternatively, the communications manager 1020 may support wireless communications at a UE in accordance with examples as disclosed herein. The candidate frequency manager 1040 is capable of, configured to, or operable to support a means for receiving a set of candidate frequencies for one or more measurements associated with a first initial downlink bandwidth part (BWP) that is used for wireless communications of both a first radio access technology and a second radio access technology. The reference signal measurement manager 1045 is capable of, configured to, or operable to support a means for measuring one or more channel parameters associated with one or more candidate frequencies of the set of candidate frequencies. The measurement report manager 1050 is capable of, configured to, or operable to support a means for transmitting a measurement report of the one or more channel parameters in a network access request using the first radio access technology or in a small data transmission using the first radio access technology.

Figure 11:
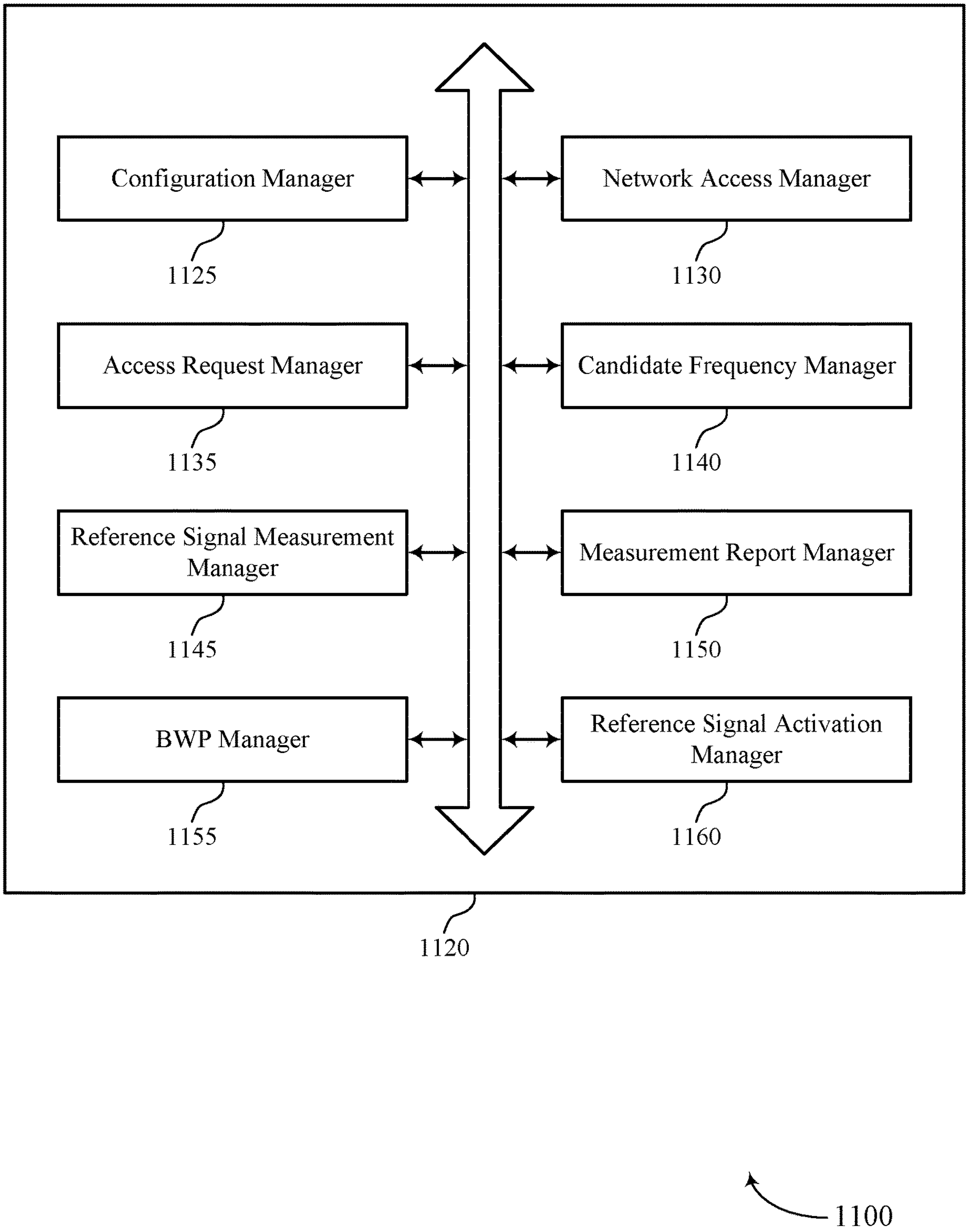
FIG. 11 shows a block diagram of a communications manager that supports techniques for accessing multiple radio access technology spectrum sharing in accordance with one or more aspects of the present disclosure.

FIG. 11 shows a block diagram 1100 of a communications manager 1120 that supports techniques for accessing multiple radio access technology spectrum sharing in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for accessing multiple radio access technology spectrum sharing as described herein. For example, the communications manager 1120 may include a configuration manager 1125, a network access manager 1130, an access request manager 1135, a candidate frequency manager 1140, a reference signal measurement manager 1145, a measurement report manager 1150, a BWP manager 1155, a reference signal activation manager 1160, or any combination thereof. Each of these components, or components or subcomponents thereof (e.g., one or more processors, one or more memories), may communicate, directly or indirectly, with one another (e.g., via one or more buses).

The communications manager 1120 may support wireless communications at a UE in accordance with examples as disclosed herein. The configuration manager 1125 is capable of, configured to, or operable to support a means for receiving configuration information that indicates a first initial downlink bandwidth part (BWP) to monitor for network access control signaling, where a first radio access technology and a second radio access technology share a set of wireless resources that are configured within the first initial downlink BWP. The network access manager 1130 is capable of, configured to, or operable to support a means for operating on the first initial downlink BWP and monitoring the network access control signaling that includes network access information for both the first radio access technology and the second radio access technology. The access request manager 1135 is capable of, configured to, or operable to support a means for transmitting a network access request using the first radio access technology based on the network access information from the network access control signaling.

In some examples, to support monitoring, the network access manager 1130 is capable of, configured to, or operable to support a means for monitoring for a cell-defining (CD) synchronization signal block (SSB) and system information transmitted within the first initial downlink BWP, where the CD SSB and system information provide synchronization and network access information for both the first radio access technology and the second radio access technology.

In some examples, the BWP manager 1155 is capable of, configured to, or operable to support a means for receiving additional configuration information associated with the first radio access technology that indicates one or more of a second initial downlink BWP or a second initial uplink BWP that is associated with access for the first radio access technology, where the one or more of the second initial downlink BWP or the second initial uplink BWP are provided in addition to the first initial downlink BWP shared by the first radio access technology and the second radio access technology, or a first initial uplink BWP associated with the second radio access technology. In some examples, the second initial downlink BWP has an associated center frequency that is unaligned with a center frequency of one or more of the first initial downlink BWP, the second initial uplink BWP associated with the first radio access technology, or the first initial uplink BWP associated with the second radio access technology.

In some examples, the network access manager 1130 is capable of, configured to, or operable to support a means for receiving, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology. In some examples, the network access manager 1130 is capable of, configured to, or operable to support a means for monitoring the second initial downlink BWP for at least the portion of the additional network access control signaling. In some examples, the control signaling further indicates a second initial uplink BWP associated with network access for the first radio access technology that is different than a first initial uplink BWP associated with network access for the second radio access technology, and where the second initial uplink BWP is switched independent of which of the first initial downlink BWP or the second initial downlink BWP is monitored for the network access control signaling.

In some examples, the reference signal activation manager 1160 is capable of, configured to, or operable to support a means for transmitting, based on the configuration information for the first radio access technology, a request for activation of an on-demand downlink reference signal responsive to determining that the second initial downlink BWP does not include a cell-defining (CD) synchronization signal block (SSB). In some examples, the reference signal measurement manager 1145 is capable of, configured to, or operable to support a means for monitoring for the on-demand downlink reference signal on the second initial downlink BWP responsive to the request being granted, or switch to the first initial downlink BWP to monitor for a CD-SSB responsive to the request not being granted. In some examples, the request for activation of the on-demand downlink reference signal is an explicit request or an implicit request provided via a physical random access channel (PRACH), an PUSCH, a PUCCH, or any combinations thereof.

In some examples, the candidate frequency manager 1140 is capable of, configured to, or operable to support a means for receiving a set of candidate frequencies associated with one or more cells configured for shared access of both the first radio access technology and the second radio access technology. In some examples, the reference signal measurement manager 1145 is capable of, configured to, or operable to support a means for measuring one or more reference signals received via one or more candidate frequencies of the set of candidate frequencies. In some examples, the measurement report manager 1150 is capable of, configured to, or operable to support a means for transmitting a measurement report for the one or more reference signals in a random access message or in a small data transmission message. In some examples, the set of candidate frequencies is received in one or more of RRC signaling, a system information communication, or a multicast and broadcast service (MBS) communication, and where the set of candidate frequencies is received before or after releasing an RRC connection at the UE.

Additionally, or alternatively, the communications manager 1120 may support wireless communications at a UE in accordance with examples as disclosed herein. The candidate frequency manager 1140 is capable of, configured to, or operable to support a means for receiving a set of candidate frequencies for one or more measurements associated with a first initial downlink bandwidth part (BWP) that is used for wireless communications of both a first radio access technology and a second radio access technology. The reference signal measurement manager 1145 is capable of, configured to, or operable to support a means for measuring one or more channel parameters associated with one or more candidate frequencies of the set of candidate frequencies. The measurement report manager 1150 is capable of, configured to, or operable to support a means for transmitting a measurement report of the one or more channel parameters in a network access request using the first radio access technology or in a small data transmission using the first radio access technology. In some examples, the set of candidate frequencies is received in one or more of RRC signaling, a system information communication, or a MBS communication, and where the set of candidate frequencies is received before or after releasing an RRC connection at the UE.

In some examples, the candidate frequency manager 1140 is capable of, configured to, or operable to support a means for receiving, after a release of an RRC connection, an updated set of candidate frequencies for one or more measurements, where the updated set of candidate frequencies is received as part of a random access procedure, as part of a small data transmission procedure, via a multicast control channel (MCCH), via a multicast traffic channel (MTCH), or as part of short message communication in an RRC inactive state or RRC idle state.

In some examples, the configuration manager 1125 is capable of, configured to, or operable to support a means for receiving configuration information that indicates the first initial downlink BWP is to be monitored for network access control signaling, where the first radio access technology and the second radio access technology share a set of wireless resources that are configured within the first initial downlink BWP. In some examples, the network access manager 1130 is capable of, configured to, or operable to support a means for operating on the first initial downlink BWP and monitoring the network access control signaling that includes network access information for both the first radio access technology and the second radio access technology. In some examples, the access request manager 1135 is capable of, configured to, or operable to support a means for transmitting a network access request to using the first radio access technology based on the network access information from the network access control signaling. In some examples, to support monitoring, the network access manager 1130 is capable of, configured to, or operable to support a means for monitoring for a CD-SSB and system information that are transmitted within the first initial downlink BWP, where the CD-SSB and system information provide network access information for both the first radio access technology and the second radio access technology.

Figure 12:
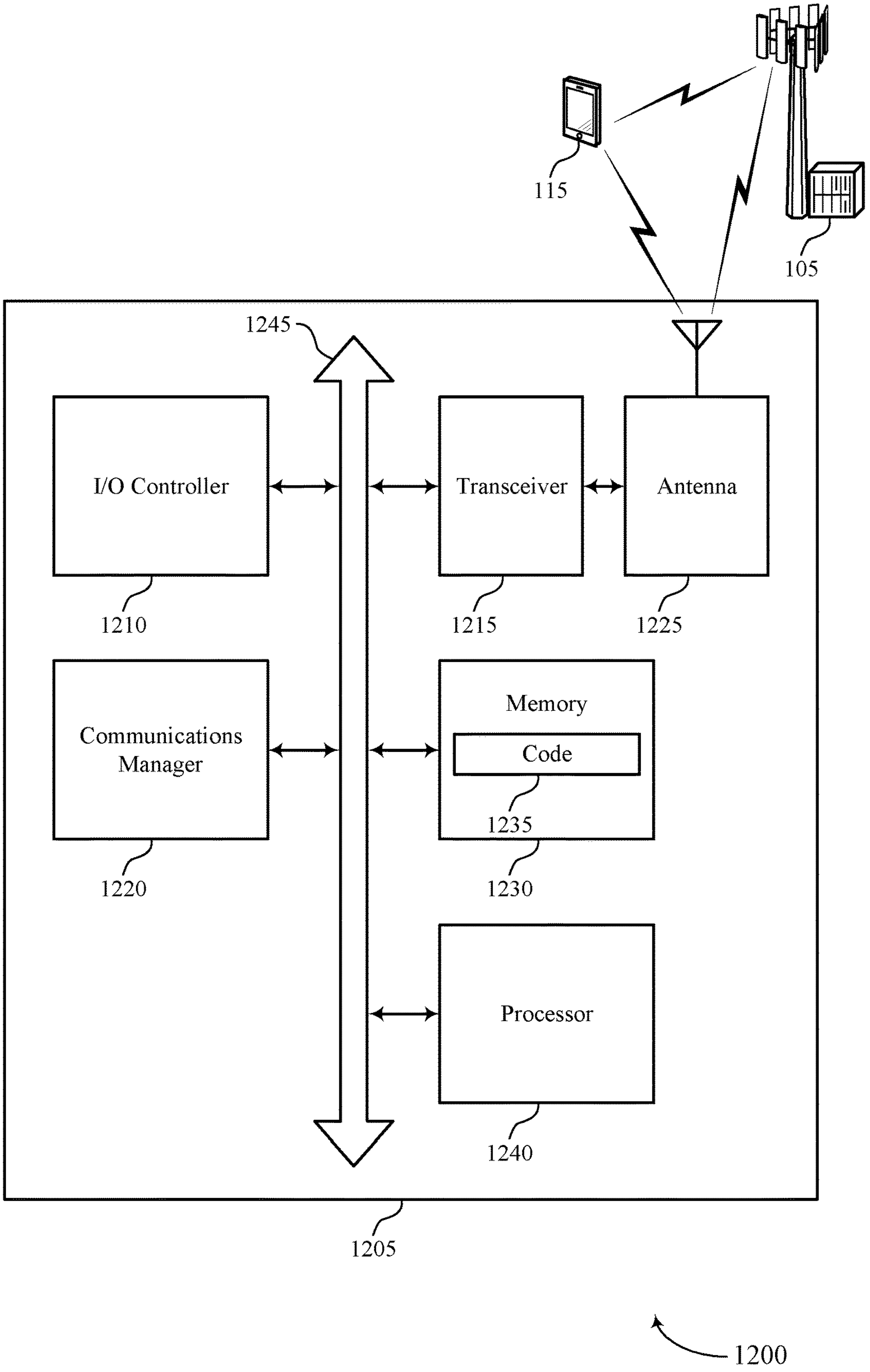
FIG. 12 shows a diagram of a system including a device that supports techniques for accessing multiple radio access technology spectrum sharing in accordance with one or more aspects of the present disclosure.

FIG. 12 shows a diagram of a system 1200 including a device 1205 that supports techniques for accessing multiple radio access technology spectrum sharing in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting techniques for accessing multiple radio access technology spectrum sharing). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communications at a UE in accordance with examples as disclosed herein. For example, the communications manager 1220 is capable of, configured to, or operable to support a means for receiving configuration information that indicates a first initial downlink bandwidth part (BWP) to monitor for network access control signaling, where a first radio access technology and a second radio access technology share a set of wireless resources that are configured within the first initial downlink BWP. The communications manager 1220 is capable of, configured to, or operable to support a means for operating on the first initial downlink BWP and monitoring the network access control signaling that includes network access information for both the first radio access technology and the second radio access technology. The communications manager 1220 is capable of, configured to, or operable to support a means for transmitting a network access request using the first radio access technology based on the network access information from the network access control signaling.

Additionally, or alternatively, the communications manager 1220 may support wireless communications at a UE in accordance with examples as disclosed herein. For example, the communications manager 1220 is capable of, configured to, or operable to support a means for receiving a set of candidate frequencies for one or more measurements associated with a first initial downlink bandwidth part (BWP) that is used for wireless communications of both a first radio access technology and a second radio access technology. The communications manager 1220 is capable of, configured to, or operable to support a means for measuring one or more channel parameters associated with one or more candidate frequencies of the set of candidate frequencies. The communications manager 1220 is capable of, configured to, or operable to support a means for transmitting a measurement report of the one or more channel parameters in a network access request using the first radio access technology or in a small data transmission using the first radio access technology.

By including or configuring the communications manager 1220 in accordance with examples as described herein, the device 1205 may support techniques for network access for different RATs through efficient use of common wireless resources for each different RAT, which may enhance the efficiency of wireless resource usage through flexible communication of network access information for multiple RATs that may be received at different UEs that use different RATs.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of techniques for accessing multiple radio access technology spectrum sharing as described herein, or the at least one processor 1240 and the at least one memory 1230 may be otherwise configured to, individually or collectively, perform or support such operations.

Figure 13:
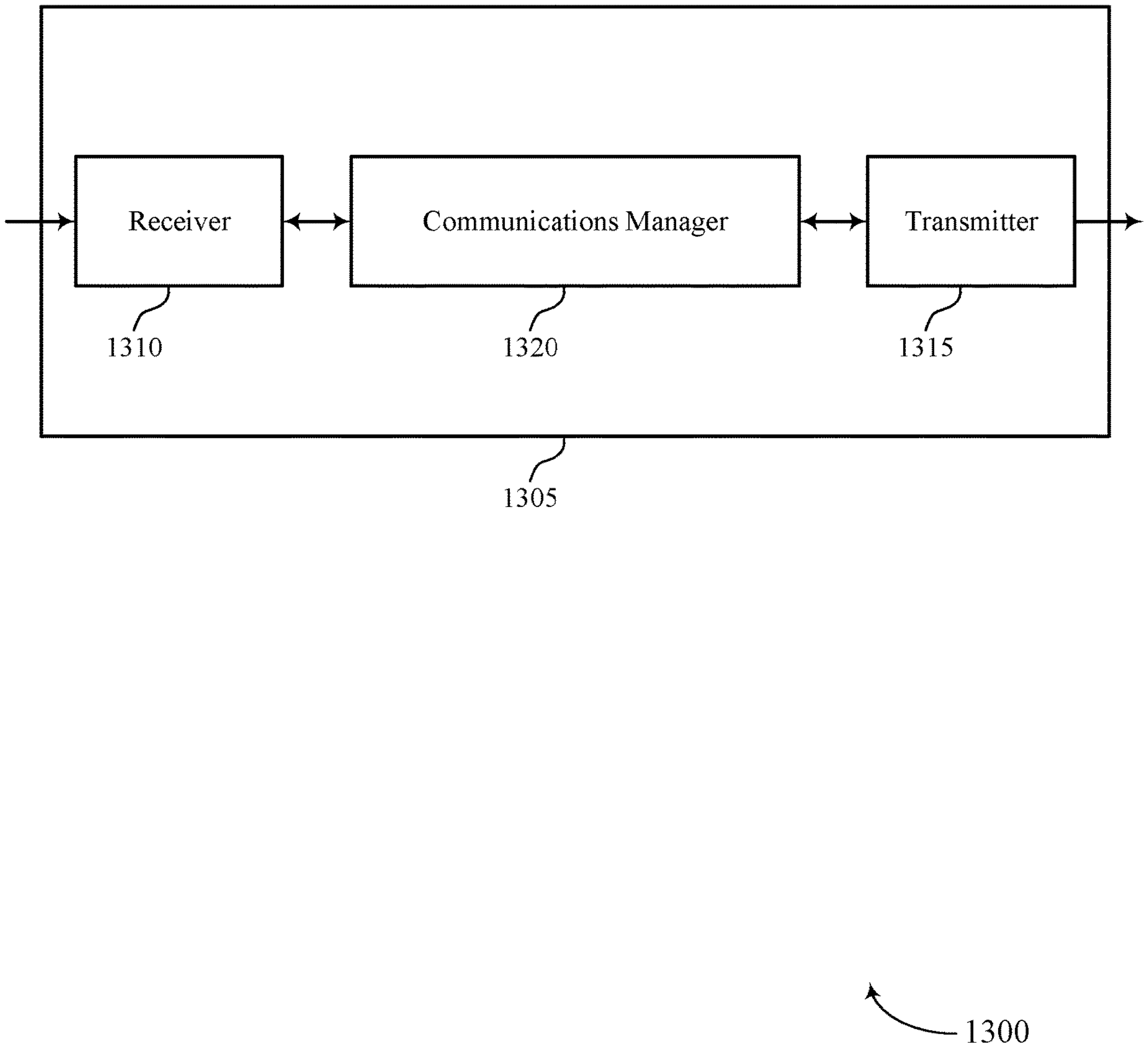
FIGS. 13 and 14 show block diagrams of devices that support techniques for accessing multiple radio access technology spectrum sharing in accordance with one or more aspects of the present disclosure.

FIG. 13 shows a block diagram 1300 of a device 1305 that supports techniques for accessing multiple radio access technology spectrum sharing in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for accessing multiple radio access technology spectrum sharing as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. For example, the communications manager 1320 is capable of, configured to, or operable to support a means for transmitting configuration information to at least a first UE and a second UE that indicates a first initial downlink bandwidth part (BWP) for network access control signaling, where the first UE uses a first radio access technology and the second UE uses a second radio access technology, and where the first radio access technology and the second radio access technology share a set of wireless resources configured within the first initial downlink BWP. The communications manager 1320 is capable of, configured to, or operable to support a means for transmitting, via the first initial downlink BWP, the network access control signaling, where the network access control signaling provides information for both the first radio access technology and the second radio access technology. The communications manager 1320 is capable of, configured to, or operable to support a means for receiving, from the first UE, a network access request using the first radio access technology.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for network access for different RATs through efficient use of common wireless resources for each different RAT, which may enhance the efficiency of wireless resource usage through flexible communication of network access information for multiple RATs that may be received at different UEs that use different RATs.

Figure 14:
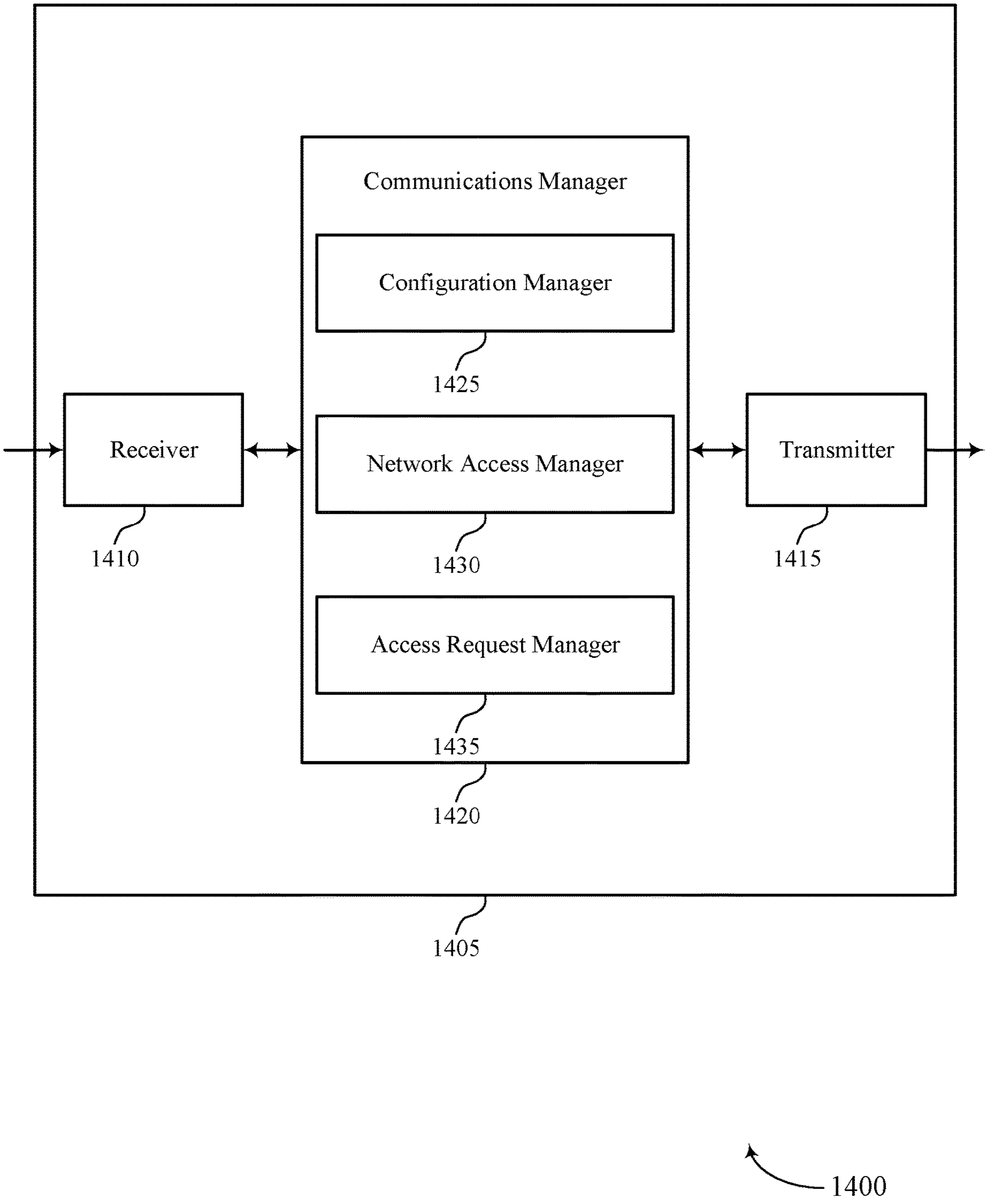

FIG. 14 shows a block diagram 1400 of a device 1405 that supports techniques for accessing multiple radio access technology spectrum sharing in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one of more components of the device 1405 (e.g., the receiver 1410, the transmitter 1415, and the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for accessing multiple radio access technology spectrum sharing as described herein. For example, the communications manager 1420 may include a configuration manager 1425, a network access manager 1430, an access request manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. The configuration manager 1425 is capable of, configured to, or operable to support a means for transmitting configuration information to at least a first UE and a second UE that indicates a first initial downlink bandwidth part (BWP) for network access control signaling, where the first UE uses a first radio access technology and the second UE uses a second radio access technology, and where the first radio access technology and the second radio access technology share a set of wireless resources configured within the first initial downlink BWP. The network access manager 1430 is capable of, configured to, or operable to support a means for transmitting, via the first initial downlink BWP, the network access control signaling, where the network access control signaling provides information for both the first radio access technology and the second radio access technology. The access request manager 1435 is capable of, configured to, or operable to support a means for receiving, from the first UE, a network access request using the first radio access technology.

Figure 15:
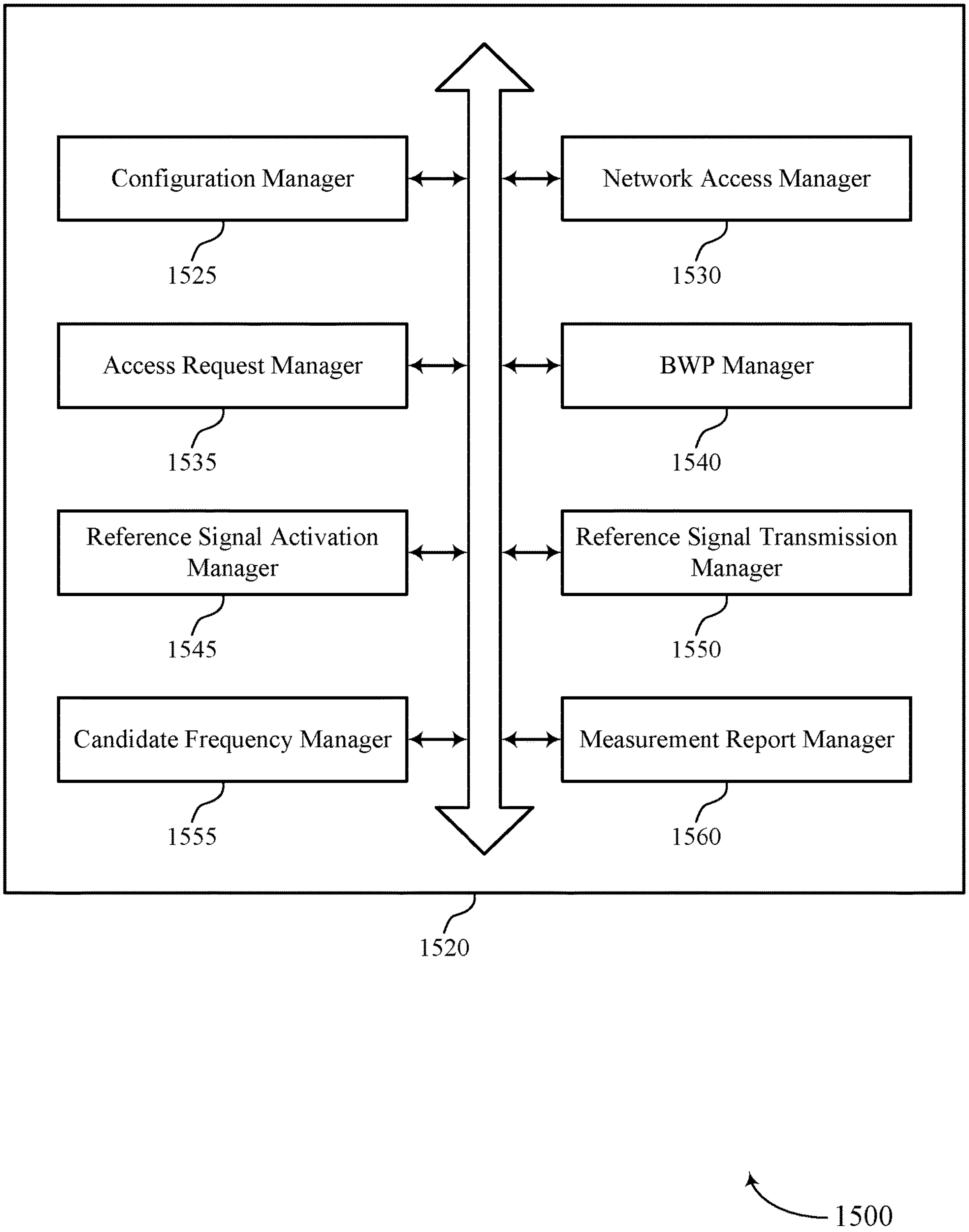
FIG. 15 shows a block diagram of a communications manager that supports techniques for accessing multiple radio access technology spectrum sharing in accordance with one or more aspects of the present disclosure.

FIG. 15 shows a block diagram 1500 of a communications manager 1520 that supports techniques for accessing multiple radio access technology spectrum sharing in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for accessing multiple radio access technology spectrum sharing as described herein. For example, the communications manager 1520 may include a configuration manager 1525, a network access manager 1530, an access request manager 1535, a BWP manager 1540, a reference signal activation manager 1545, a reference signal transmission manager 1550, a candidate frequency manager 1555, a measurement report manager 1560, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a network entity in accordance with examples as disclosed herein. The configuration manager 1525 is capable of, configured to, or operable to support a means for transmitting configuration information to at least a first UE and a second UE that indicates a first initial downlink bandwidth part (BWP) for network access control signaling, where the first UE uses a first radio access technology and the second UE uses a second radio access technology, and where the first radio access technology and the second radio access technology share a set of wireless resources configured within the first initial downlink BWP. The network access manager 1530 is capable of, configured to, or operable to support a means for transmitting, via the first initial downlink BWP, the network access control signaling, where the network access control signaling provides information for both the first radio access technology and the second radio access technology. The access request manager 1535 is capable of, configured to, or operable to support a means for receiving, from the first UE, a network access request using the first radio access technology. In some examples, the network access control signaling is provided in a CD-SSB and system information transmitted in the first initial downlink BWP, where the CD-SSB and system information provide network access information for both the first radio access technology and the second radio access technology.

In some examples, the BWP manager 1540 is capable of, configured to, or operable to support a means for transmitting, to the first UE, additional configuration information associated with the first radio access technology that indicates one or more of a second initial downlink BWP or a second initial uplink BWP that is associated with network access for the first radio access technology, where the one or more of the second initial downlink BWP or the second initial uplink BWP are provided in addition to the first initial downlink BWP.

In some examples, the network access manager 1530 is capable of, configured to, or operable to support a means for transmitting, to the first UE while the first UE is in an idle or inactive state, control signaling that indicates BWP switching from the first initial downlink BWP to a second initial downlink BWP to monitored at least a portion of the network access control signaling. In some examples, the network access manager 1530 is capable of, configured to, or operable to support a means for transmitting, within the second initial downlink BWP, at least the portion of the network access control signaling associated with the first radio access technology.

In some examples, the reference signal activation manager 1560 is capable of, configured to, or operable to support a means for receiving, from the first UE based on the configuration information, a request for activation of an on-demand downlink reference signal. In some examples, the reference signal transmission manager 1550 is capable of, configured to, or operable to support a means for transmitting, responsive to the request for activation, one of the on-demand downlink reference signal in the second initial downlink BWP, or control signaling that triggers the UE to switch to the first initial downlink BWP to monitor for a cell-defining (CD) synchronization signal block (SSB) in the first initial downlink BWP.

In some examples, the candidate frequency manager 1545 is capable of, configured to, or operable to support a means for transmitting, to the first UE, a set of candidate frequencies associated with one or more cells configured for shared access of both the first radio access technology and the second radio access technology. In some examples, the reference signal transmission manager 1550 is capable of, configured to, or operable to support a means for transmitting one or more reference signals using one or more candidate frequencies of the set of candidate frequencies. In some examples, the measurement report manager 1555 is capable of, configured to, or operable to support a means for receiving a measurement report for the one or more reference signals from the first UE in a random access message or in a small data transmission message.

Figure 16:
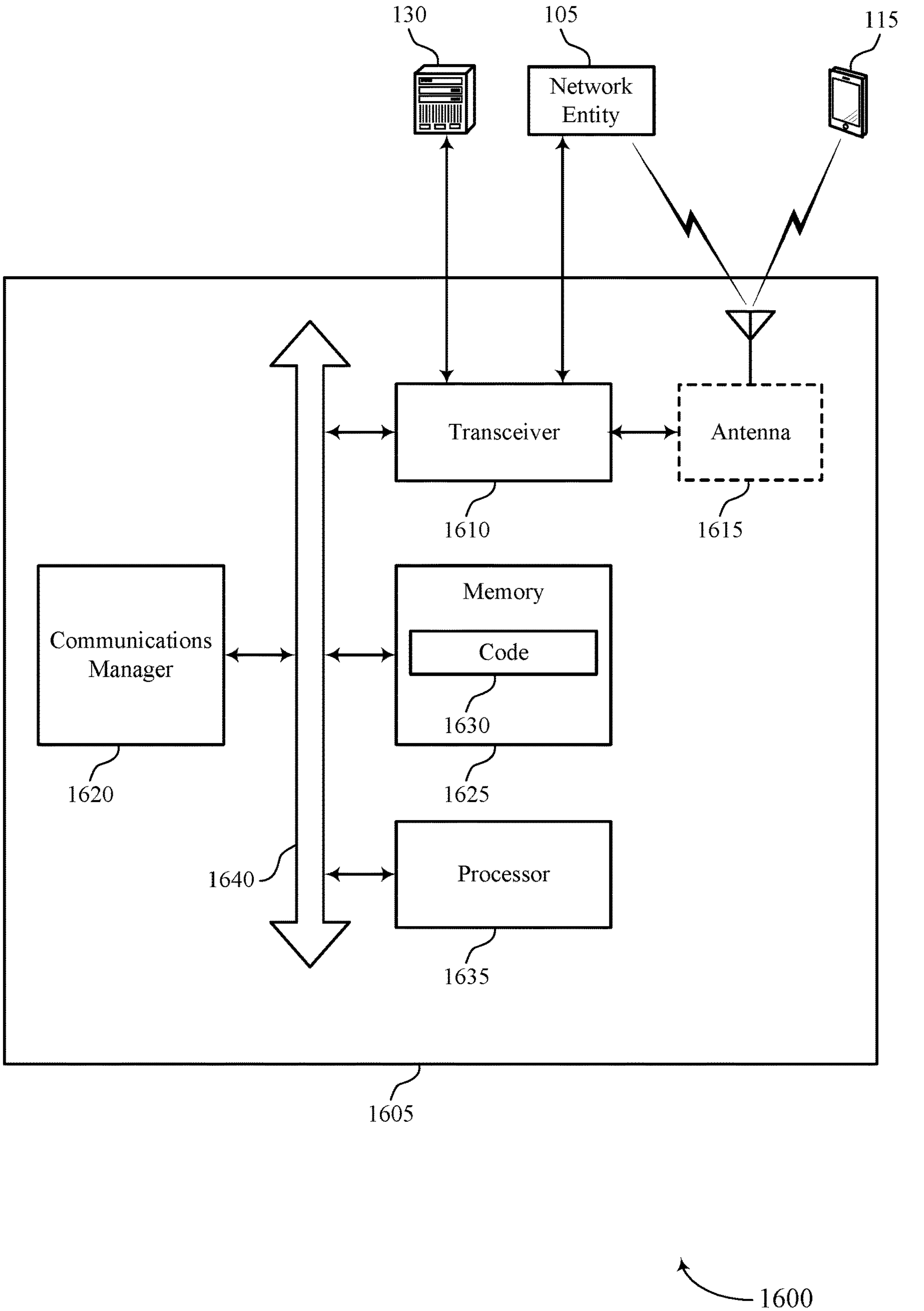
FIG. 16 shows a diagram of a system including a device that supports techniques for accessing multiple radio access technology spectrum sharing in accordance with one or more aspects of the present disclosure.

FIG. 16 shows a diagram of a system 1600 including a device 1605 that supports techniques for accessing multiple radio access technology spectrum sharing in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting techniques for accessing multiple radio access technology spectrum sharing). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some implementations, the at least one processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the at least one processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications at a network entity in accordance with examples as disclosed herein. For example, the communications manager 1620 is capable of, configured to, or operable to support a means for transmitting configuration information to at least a first UE and a second UE that indicates a first initial downlink bandwidth part (BWP) for network access control signaling, where the first UE uses a first radio access technology and the second UE uses a second radio access technology, and where the first radio access technology and the second radio access technology share a set of wireless resources configured within the first initial downlink BWP. The communications manager 1620 is capable of, configured to, or operable to support a means for transmitting, via the first initial downlink BWP, the network access control signaling, where the network access control signaling provides information for both the first radio access technology and the second radio access technology. The communications manager 1620 is capable of, configured to, or operable to support a means for receiving, from the first UE, a network access request using the first radio access technology.

By including or configuring the communications manager 1620 in accordance with examples as described herein, the device 1605 may support techniques for network access for different RATs through efficient use of common wireless resources for each different RAT, which may enhance the efficiency of wireless resource usage through flexible communication of network access information for multiple RATs that may be received at different UEs that use different RATs.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of techniques for accessing multiple radio access technology spectrum sharing as described herein, or the at least one processor 1635 and the at least one memory 1625 may be otherwise configured to, individually or collectively, perform or support such operations.

Figure 17:
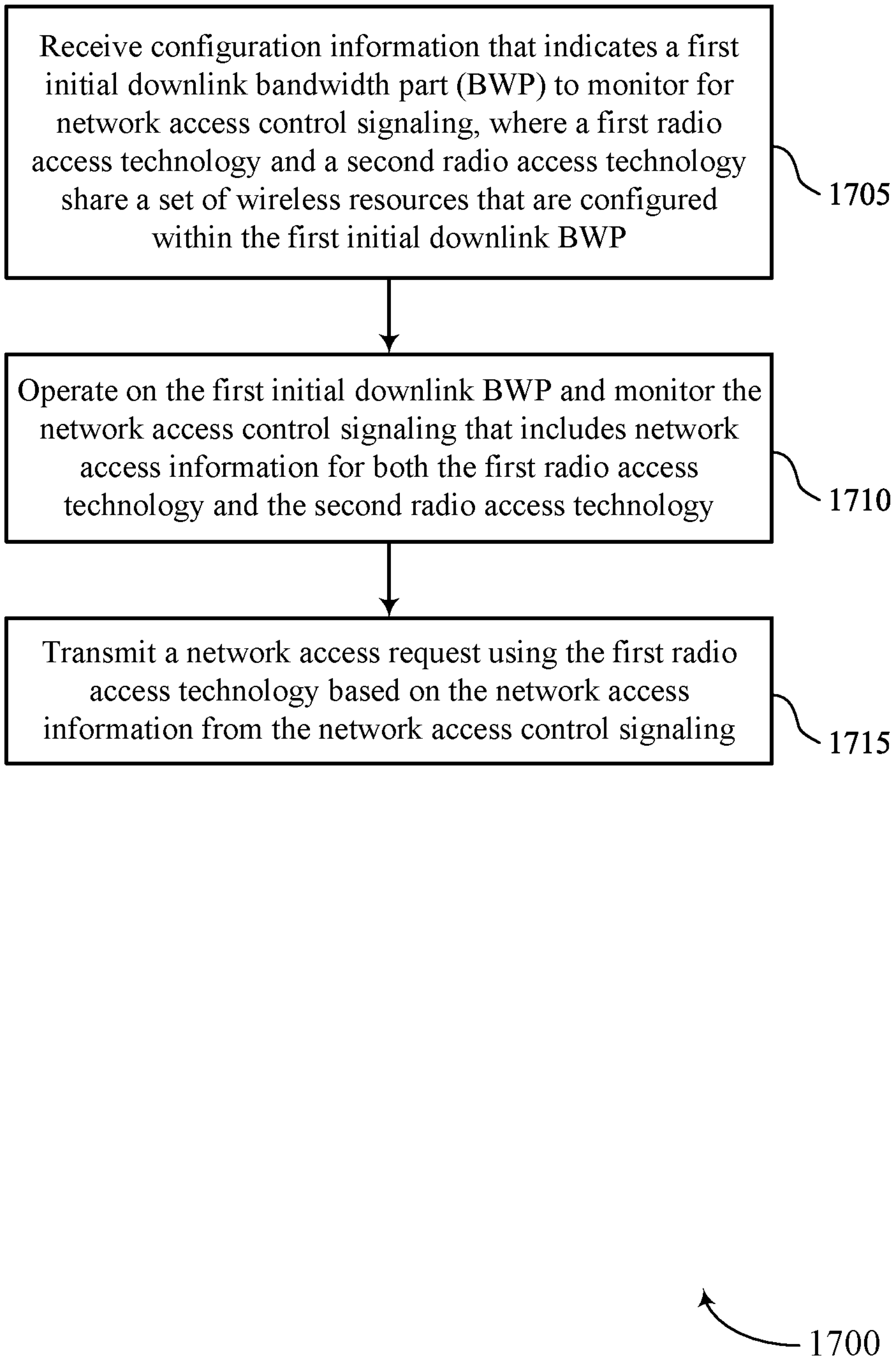
FIGS. 17 through 28 show flowcharts illustrating methods that support techniques for accessing multiple radio access technology spectrum sharing in accordance with one or more aspects of the present disclosure.

FIG. 17 shows a flowchart illustrating a method 1700 that supports techniques for accessing multiple radio access technology spectrum sharing in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving configuration information that indicates a first initial downlink BWP to monitor for network access control signaling, where a first radio access technology and a second radio access technology share a set of wireless resources that are configured within the first initial downlink BWP. The operations of block 1705 may be performed in accordance with examples as disclosed herein. In some examples, aspects of the operations of 1705 may be performed by a configuration manager 1125 as described with reference to FIG. 11.

At 1710, the method may include operating on the first initial downlink BWP and monitoring the network access control signaling that includes network access information for both the first radio access technology and the second radio access technology. The operations of block 1710 may be performed in accordance with examples as disclosed herein. In some examples, aspects of the operations of 1710 may be performed by a network access manager 1130 as described with reference to FIG. 11.

At 1715, the method may include transmitting a network access request using the first radio access technology based on the network access information from the network access control signaling. The operations of block 1715 may be performed in accordance with examples as disclosed herein. In some examples, aspects of the operations of 1715 may be performed by an access request manager 1135 as described with reference to FIG. 11.

Figure 18:
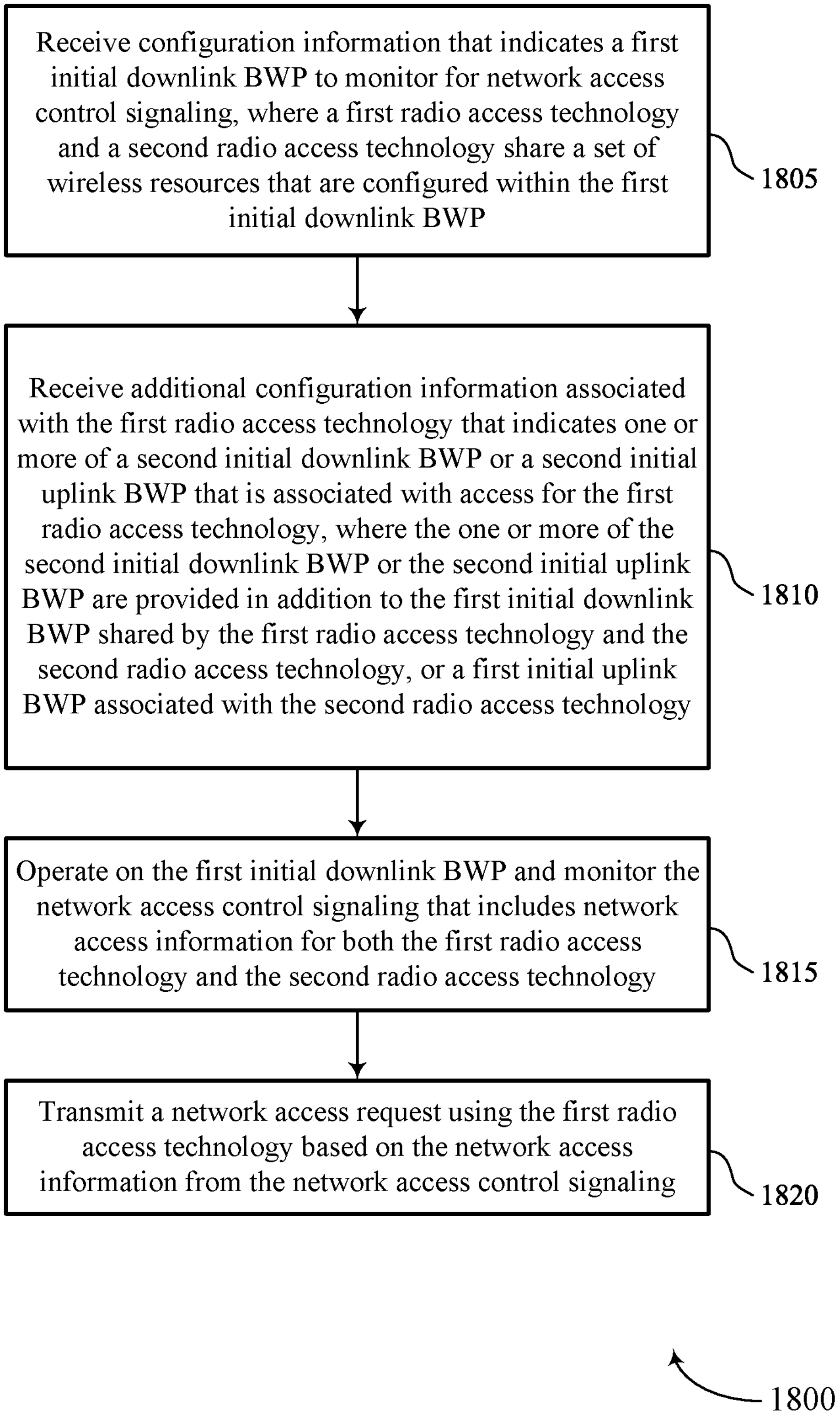

FIG. 18 shows a flowchart illustrating a method 1800 that supports techniques for accessing multiple radio access technology spectrum sharing in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving configuration information that indicates a first initial downlink BWP to monitor for network access control signaling, where a first radio access technology and a second radio access technology share a set of wireless resources that are configured within the first initial downlink BWP. The operations of block 1805 may be performed in accordance with examples as disclosed herein. In some examples, aspects of the operations of 1805 may be performed by a configuration manager 1125 as described with reference to FIG. 11.

At 1810, the method may include receiving additional configuration information associated with the first radio access technology that indicates one or more of a second initial downlink BWP or a second initial uplink BWP that is associated with access for the first radio access technology, where the one or more of the second initial downlink BWP or the second initial uplink BWP are provided in addition to the first initial downlink BWP shared by the first radio access technology and the second radio access technology, or a first initial uplink BWP associated with the second radio access technology. The operations of block 1810 may be performed in accordance with examples as disclosed herein. In some examples, aspects of the operations of 1810 may be performed by a BWP manager 1155 as described with reference to FIG. 11.

At 1815, the method may include operating on the first initial downlink BWP and monitoring the network access control signaling that includes network access information for both the first radio access technology and the second radio access technology. The operations of block 1815 may be performed in accordance with examples as disclosed herein. In some examples, aspects of the operations of 1815 may be performed by a network access manager 1130 as described with reference to FIG. 11.

At 1820, the method may include transmitting a network access request using the first radio access technology based on the network access information from the network access control signaling. The operations of block 1820 may be performed in accordance with examples as disclosed herein. In some examples, aspects of the operations of 1820 may be performed by an access request manager 1135 as described with reference to FIG. 11.

Figure 19:
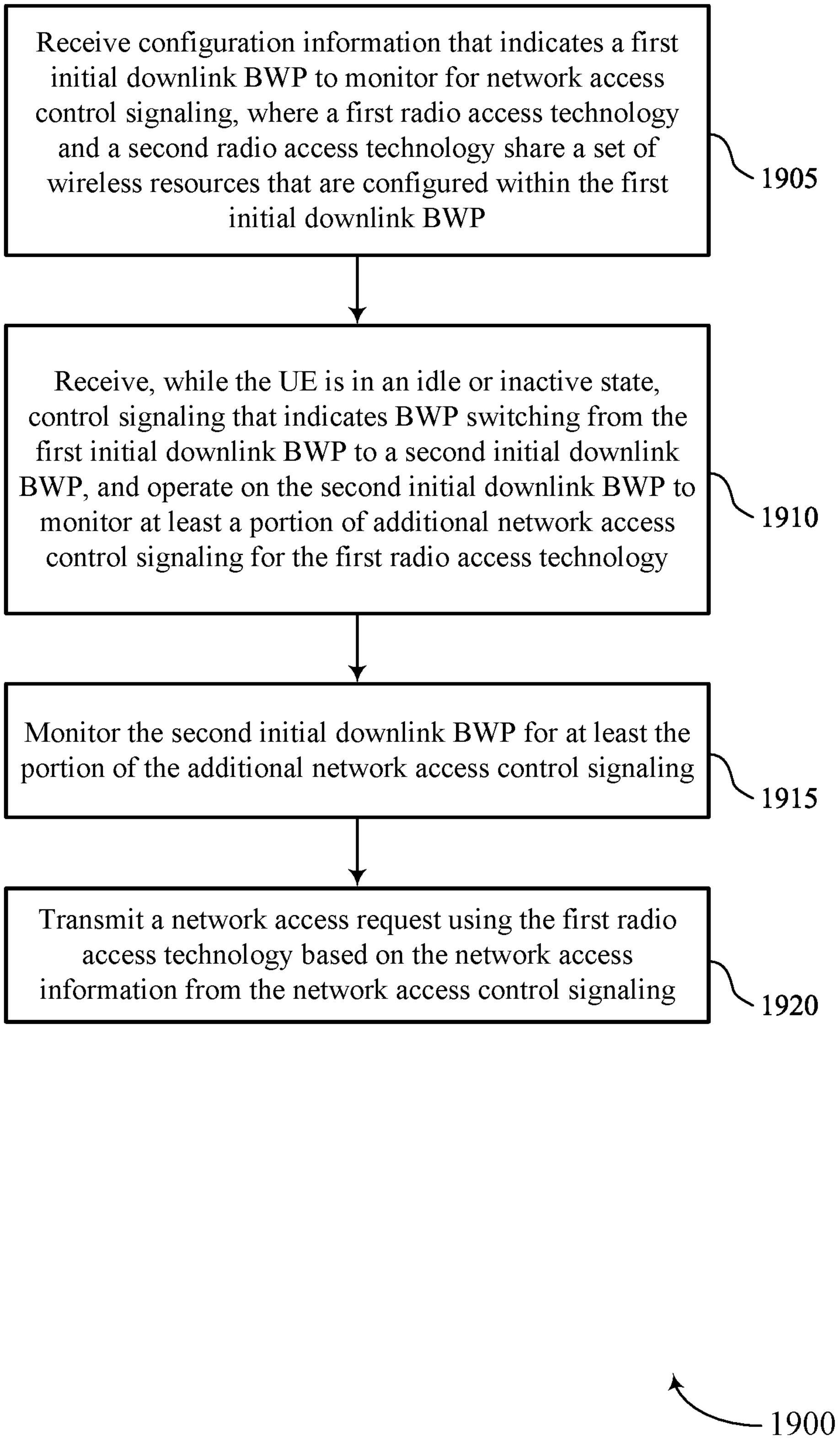

FIG. 19 shows a flowchart illustrating a method 1900 that supports techniques for accessing multiple radio access technology spectrum sharing in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving configuration information that indicates a first initial downlink BWP to monitor for network access control signaling, where a first radio access technology and a second radio access technology share a set of wireless resources that are configured within the first initial downlink BWP. The operations of block 1905 may be performed in accordance with examples as disclosed herein. In some examples, aspects of the operations of 1905 may be performed by a configuration manager 1125 as described with reference to FIG. 11.

At 1910, the method may include receiving, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology. The operations of block 1910 may be performed in accordance with examples as disclosed herein. In some examples, aspects of the operations of 1910 may be performed by a network access manager 1130 as described with reference to FIG. 11.

At 1915, the method may include monitoring the second initial downlink BWP for at least the portion of the additional network access control signaling. The operations of block 1915 may be performed in accordance with examples as disclosed herein. In some examples, aspects of the operations of 1915 may be performed by a network access manager 1130 as described with reference to FIG. 11.

At 1920, the method may include transmitting a network access request using the first radio access technology based on the network access information from the network access control signaling. The operations of block 1920 may be performed in accordance with examples as disclosed herein. In some examples, aspects of the operations of 1920 may be performed by an access request manager 1135 as described with reference to FIG. 11.

Figure 20:
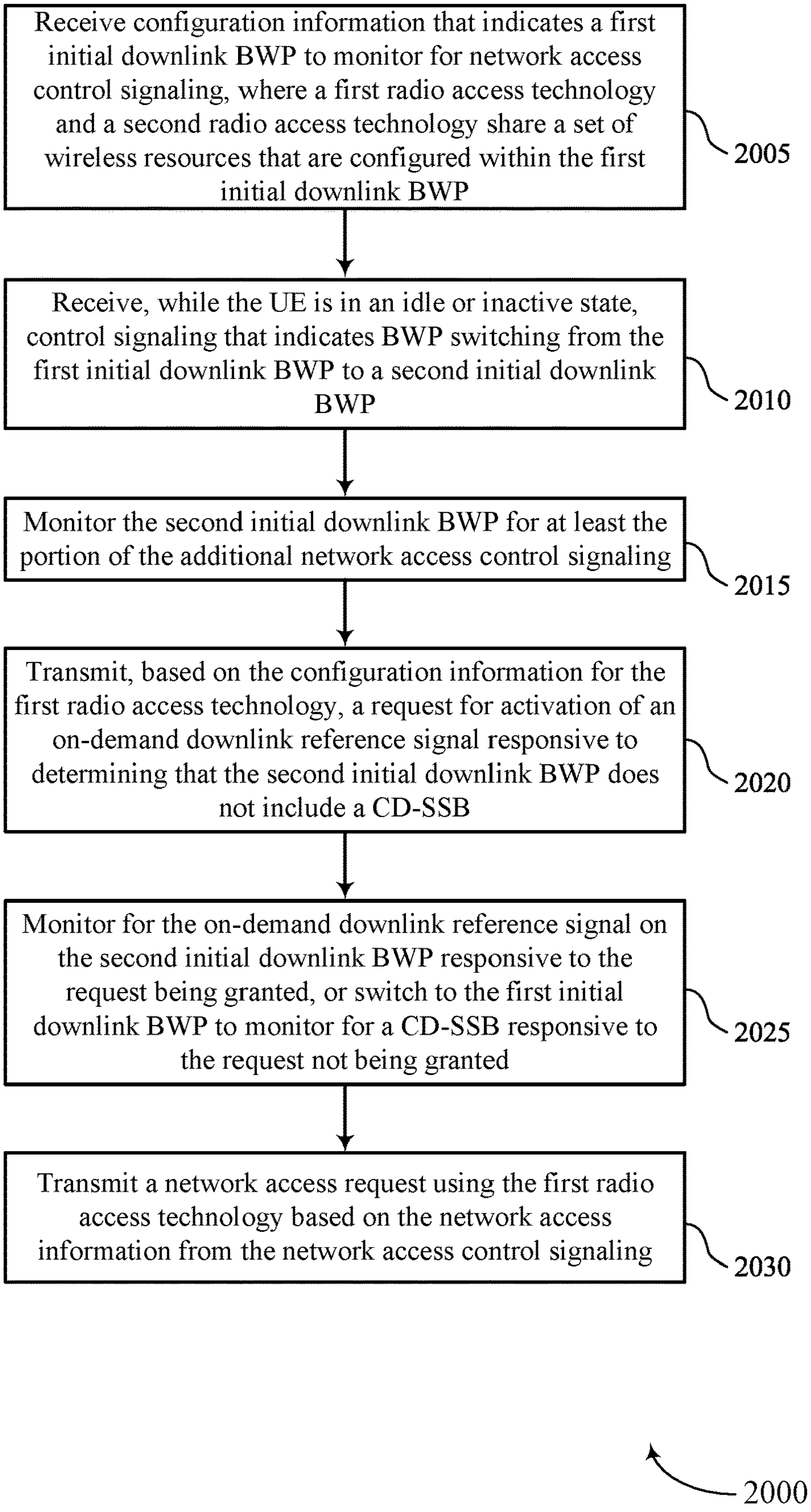

FIG. 20 shows a flowchart illustrating a method 2000 that supports techniques for accessing multiple radio access technology spectrum sharing in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2005, the method may include receiving configuration information that indicates a first initial downlink BWP to monitor for network access control signaling, where a first radio access technology and a second radio access technology share a set of wireless resources that are configured within the first initial downlink BWP. The operations of block 2005 may be performed in accordance with examples as disclosed herein. In some examples, aspects of the operations of 2005 may be performed by a configuration manager 1125 as described with reference to FIG. 11.

At 2010, the method may include receiving, while the UE is in an idle or inactive state, control signaling that indicates BWP switching from the first initial downlink BWP to a second initial downlink BWP. The operations of block 2010 may be performed in accordance with examples as disclosed herein. In some examples, aspects of the operations of 2010 may be performed by a network access manager 1130 as described with reference to FIG. 11.

At 2015, the method may include monitoring the second initial downlink BWP for at least the portion of the additional network access control signaling. The operations of block 2015 may be performed in accordance with examples as disclosed herein. In some examples, aspects of the operations of 2015 may be performed by a network access manager 1130 as described with reference to FIG. 11.

At 2020, the method may include transmitting, based on the configuration information for the first radio access technology, a request for activation of an on-demand downlink reference signal responsive to determining that the second initial downlink BWP does not include a CD-SSB. The operations of block 2020 may be performed in accordance with examples as disclosed herein. In some examples, aspects of the operations of 2020 may be performed by a reference signal activation manager 1160 as described with reference to FIG. 11.

At 2025, the method may include monitoring for the on-demand downlink reference signal on the second initial downlink BWP responsive to the request being granted, or switch to the first initial downlink BWP to monitor for a CD-SSB responsive to the request not being granted. The operations of block 2025 may be performed in accordance with examples as disclosed herein. In some examples, aspects of the operations of 2025 may be performed by a reference signal measurement manager 1145 as described with reference to FIG. 11.

At 2030, the method may include transmitting a network access request using the first radio access technology based on the network access information from the network access control signaling. The operations of block 2030 may be performed in accordance with examples as disclosed herein. In some examples, aspects of the operations of 2030 may be performed by an access request manager 1135 as described with reference to FIG. 11.

Figure 21:
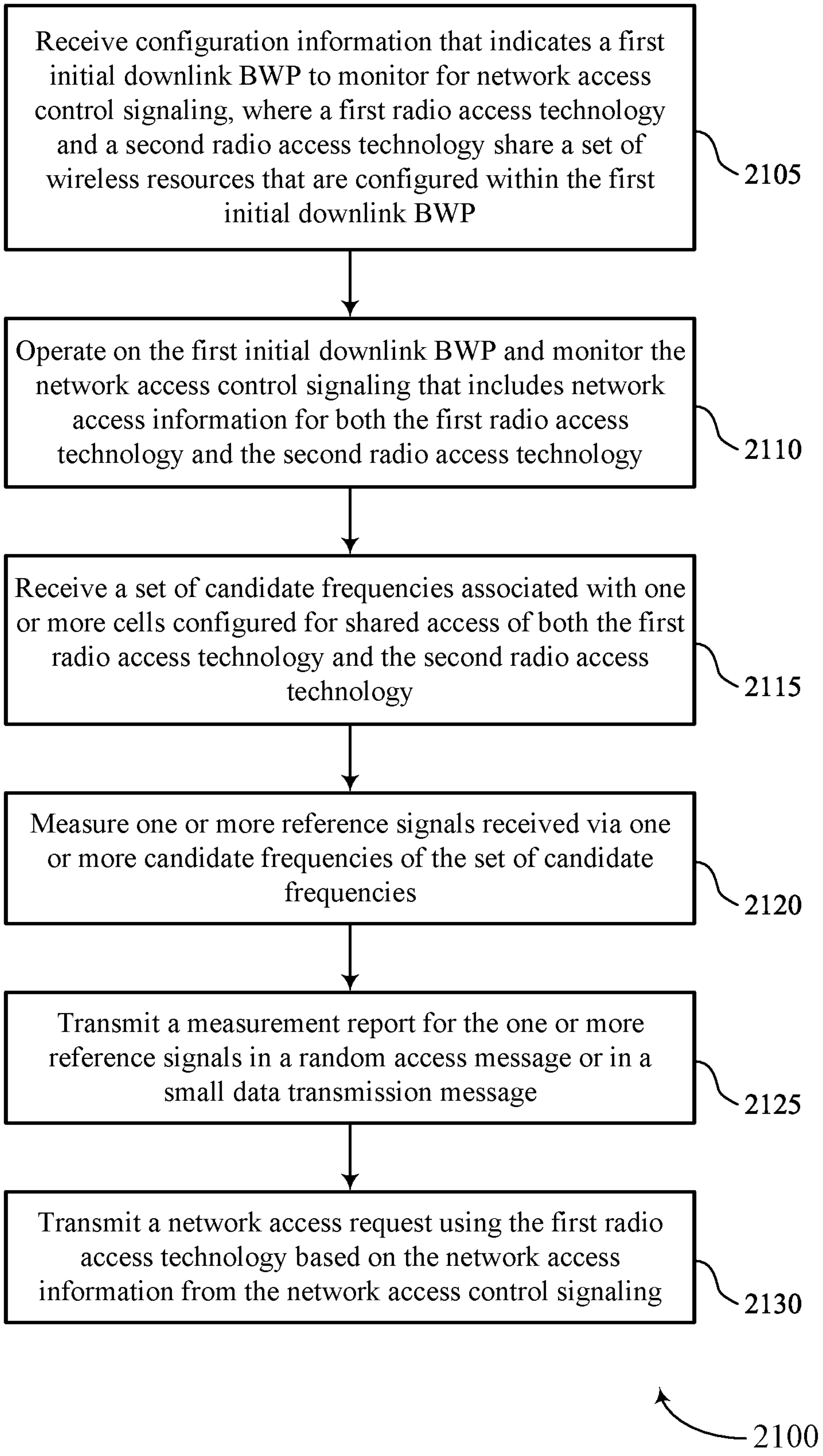

FIG. 21 shows a flowchart illustrating a method 2100 that supports techniques for accessing multiple radio access technology spectrum sharing in accordance with aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2105, the method may include receiving configuration information that indicates a first initial downlink BWP to monitor for network access control signaling, where a first radio access technology and a second radio access technology share a set of wireless resources that are configured within the first initial downlink BWP. The operations of block 2105 may be performed in accordance with examples as disclosed herein. In some examples, aspects of the operations of 2105 may be performed by a configuration manager 1125 as described with reference to FIG. 11.

At 2110, the method may include operating on the first initial downlink BWP and monitoring the network access control signaling that includes network access information for both the first radio access technology and the second radio access technology. The operations of block 2110 may be performed in accordance with examples as disclosed herein. In some examples, aspects of the operations of 2110 may be performed by a network access manager 1130 as described with reference to FIG. 11.

At 2115, the method may include receiving a set of candidate frequencies associated with one or more cells configured for shared access of both the first radio access technology and the second radio access technology. The operations of block 2115 may be performed in accordance with examples as disclosed herein. In some examples, aspects of the operations of 2115 may be performed by a candidate frequency manager 1140 as described with reference to FIG. 11.

At 2120, the method may include measuring one or more reference signals received via one or more candidate frequencies of the set of candidate frequencies. The operations of block 2120 may be performed in accordance with examples as disclosed herein. In some examples, aspects of the operations of 2120 may be performed by a reference signal measurement manager 1145 as described with reference to FIG. 11.

At 2125, the method may include transmitting a measurement report for the one or more reference signals in a random access message or in a small data transmission message. The operations of block 2125 may be performed in accordance with examples as disclosed herein. In some examples, aspects of the operations of 2125 may be performed by a measurement report manager 1150 as described with reference to FIG. 11.

At 2130, the method may include transmitting a network access request using the first radio access technology based on the network access information from the network access control signaling. The operations of block 2130 may be performed in accordance with examples as disclosed herein. In some examples, aspects of the operations of 2130 may be performed by an access request manager 1135 as described with reference to FIG. 11.

Figure 22:
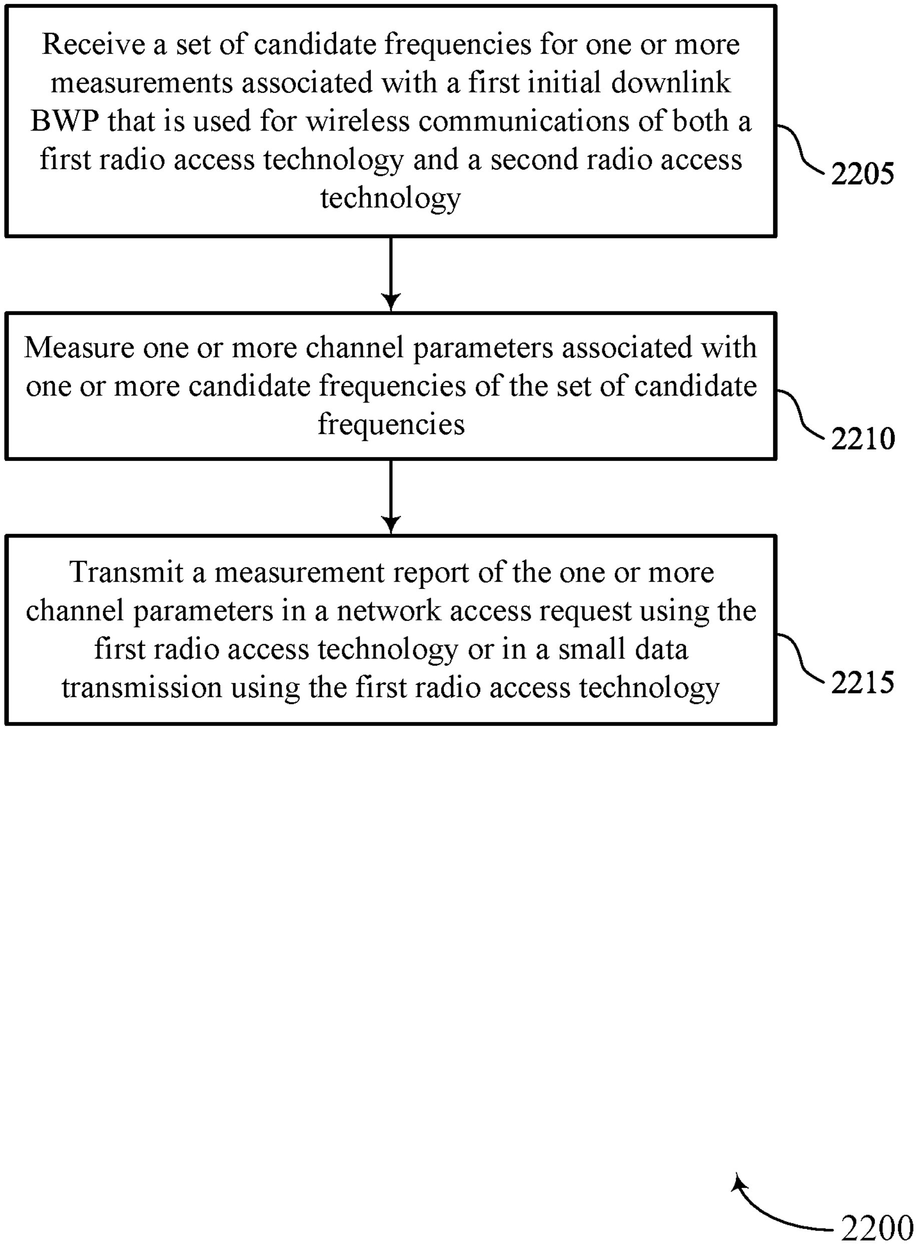

FIG. 22 shows a flowchart illustrating a method 2200 that supports techniques for accessing multiple radio access technology spectrum sharing in accordance with aspects of the present disclosure. The operations of the method 2200 may be implemented by a UE or its components as described herein. For example, the operations of the method 2200 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2205, the method may include receiving a set of candidate frequencies for one or more measurements associated with a first initial downlink BWP that is used for wireless communications of both a first radio access technology and a second radio access technology. The operations of block 2205 may be performed in accordance with examples as disclosed herein. In some examples, aspects of the operations of 2205 may be performed by a candidate frequency manager 1140 as described with reference to FIG. 11.

At 2210, the method may include measuring one or more channel parameters associated with one or more candidate frequencies of the set of candidate frequencies. The operations of block 2210 may be performed in accordance with examples as disclosed herein. In some examples, aspects of the operations of 2210 may be performed by a reference signal measurement manager 1145 as described with reference to FIG. 11.

At 2215, the method may include transmitting a measurement report of the one or more channel parameters in a network access request using the first radio access technology or in a small data transmission using the first radio access technology. The operations of block 2215 may be performed in accordance with examples as disclosed herein. In some examples, aspects of the operations of 2215 may be performed by a measurement report manager 1150 as described with reference to FIG. 11.

Figure 23:
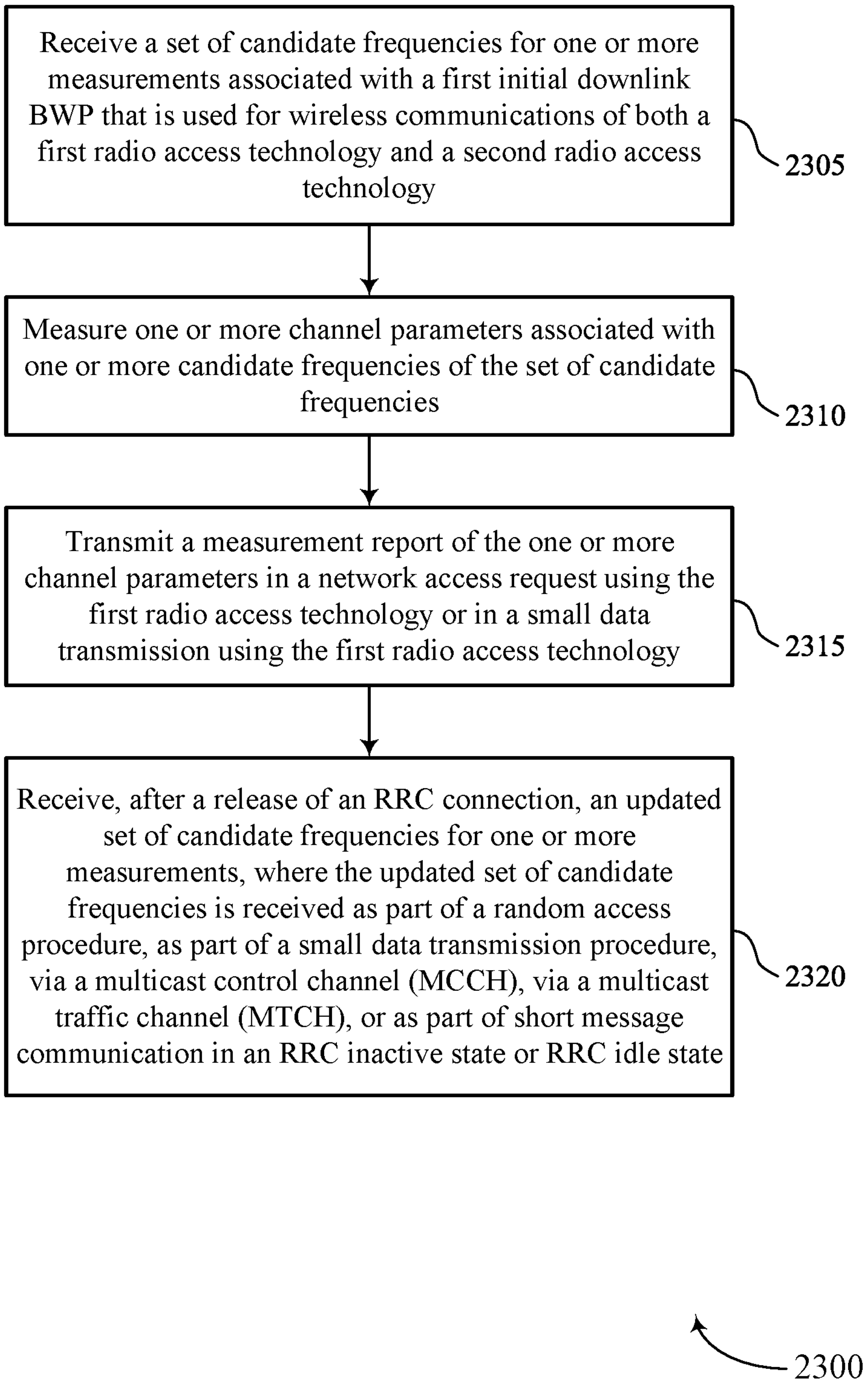

FIG. 23 shows a flowchart illustrating a method 2300 that supports techniques for accessing multiple radio access technology spectrum sharing in accordance with aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2305, the method may include receiving a set of candidate frequencies for one or more measurements associated with a first initial downlink BWP that is used for wireless communications of both a first radio access technology and a second radio access technology. The operations of block 2305 may be performed in accordance with examples as disclosed herein. In some examples, aspects of the operations of 2305 may be performed by a candidate frequency manager 1140 as described with reference to FIG. 11.

At 2310, the method may include measuring one or more channel parameters associated with one or more candidate frequencies of the set of candidate frequencies. The operations of block 2310 may be performed in accordance with examples as disclosed herein. In some examples, aspects of the operations of 2310 may be performed by a reference signal measurement manager 1145 as described with reference to FIG. 11.

At 2315, the method may include transmitting a measurement report of the one or more channel parameters in a network access request using the first radio access technology or in a small data transmission using the first radio access technology. The operations of block 2315 may be performed in accordance with examples as disclosed herein. In some examples, aspects of the operations of 2315 may be performed by a measurement report manager 1150 as described with reference to FIG. 11.

At 2320, the method may include receiving, after a release of an RRC connection, an updated set of candidate frequencies for one or more measurements, where the updated set of candidate frequencies is received as part of a random access procedure, as part of a small data transmission procedure, via a multicast control channel (MCCH), via a multicast traffic channel (MTCH), or as part of short message communication in an RRC inactive state or RRC idle state. The operations of block 2320 may be performed in accordance with examples as disclosed herein. In some examples, aspects of the operations of 2320 may be performed by a candidate frequency manager 1140 as described with reference to FIG. 11.

Figure 24:
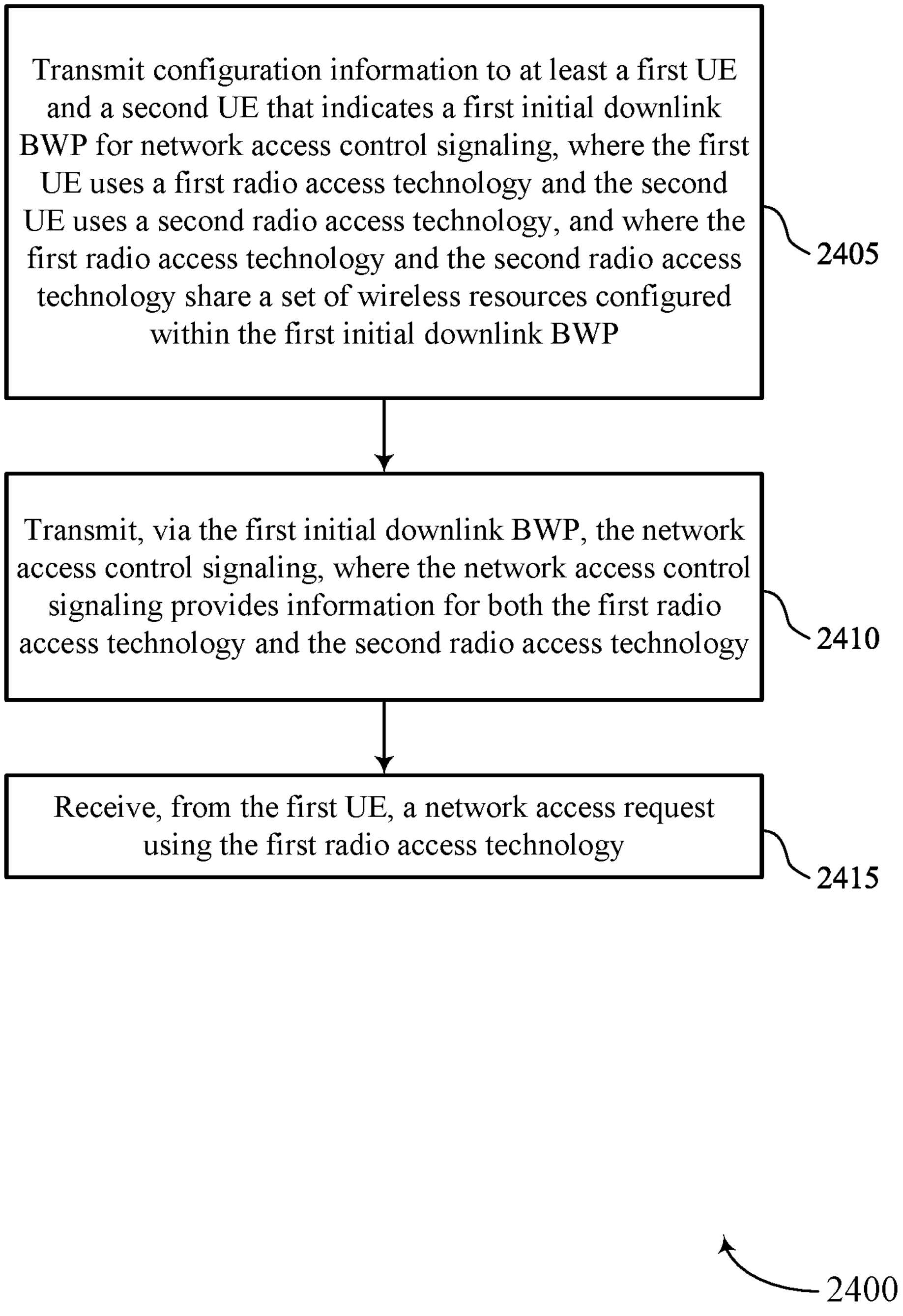

FIG. 24 shows a flowchart illustrating a method 2400 that supports techniques for accessing multiple radio access technology spectrum sharing in accordance with aspects of the present disclosure. The operations of the method 2400 may be implemented by a network entity or its components as described herein. For example, the operations of the method 2400 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2405, the method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP. The operations of block 2405 may be performed in accordance with examples as disclosed herein. In some examples, aspects of the operations of 2405 may be performed by a configuration manager 1525 as described with reference to FIG. 15.

At 2410, the method may include transmitting, via the first initial downlink BWP, the network access control signaling, where the network access control signaling provides information for both the first radio access technology and the second radio access technology. The operations of block 2410 may be performed in accordance with examples as disclosed herein. In some examples, aspects of the operations of 2410 may be performed by a network access manager 1530 as described with reference to FIG. 15.

At 2415, the method may include receiving, from the first UE, a network access request using the first radio access technology. The operations of block 2415 may be performed in accordance with examples as disclosed herein. In some examples, aspects of the operations of 2415 may be performed by an access request manager 1535 as described with reference to FIG. 15.

Figure 25:
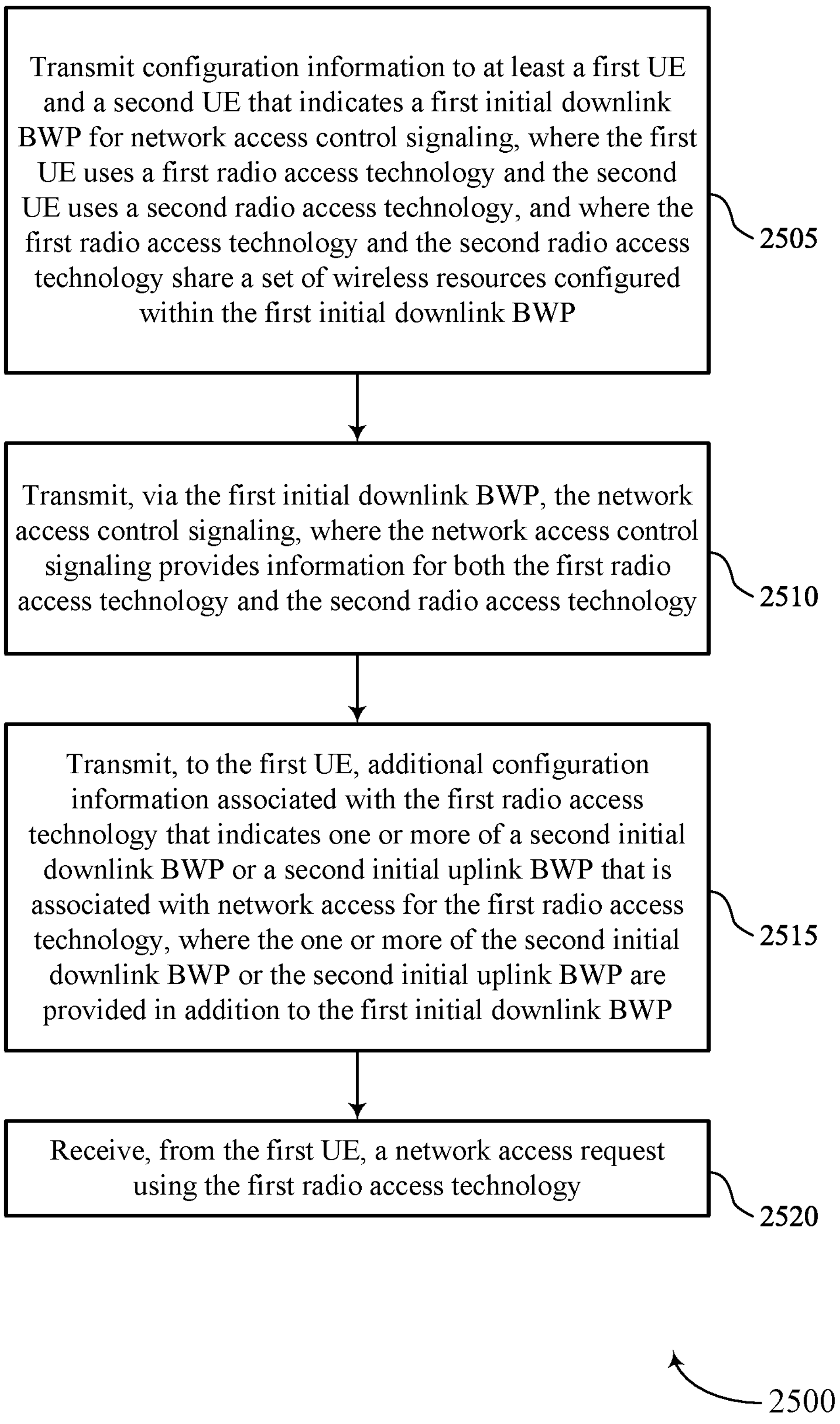

FIG. 25 shows a flowchart illustrating a method 2500 that supports techniques for accessing multiple radio access technology spectrum sharing in accordance with aspects of the present disclosure. The operations of the method 2500 may be implemented by a network entity or its components as described herein. For example, the operations of the method 2500 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2505, the method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP. The operations of block 2505 may be performed in accordance with examples as disclosed herein. In some examples, aspects of the operations of 2505 may be performed by a configuration manager 1525 as described with reference to FIG. 15.

At 2510, the method may include transmitting, via the first initial downlink BWP, the network access control signaling, where the network access control signaling provides information for both the first radio access technology and the second radio access technology. The operations of block 2510 may be performed in accordance with examples as disclosed herein. In some examples, aspects of the operations of 2510 may be performed by a network access manager 1530 as described with reference to FIG. 15.

At 2515, the method may include transmitting, to the first UE, additional configuration information associated with the first radio access technology that indicates one or more of a second initial downlink BWP or a second initial uplink BWP that is associated with network access for the first radio access technology, where the one or more of the second initial downlink BWP or the second initial uplink BWP are provided in addition to the first initial downlink BWP. The operations of block 2515 may be performed in accordance with examples as disclosed herein. In some examples, aspects of the operations of 2515 may be performed by a BWP manager 1540 as described with reference to FIG. 15.

At 2520, the method may include receiving, from the first UE, a network access request using the first radio access technology. The operations of block 2520 may be performed in accordance with examples as disclosed herein. In some examples, aspects of the operations of 2520 may be performed by an access request manager 1535 as described with reference to FIG. 15.

Figure 26:
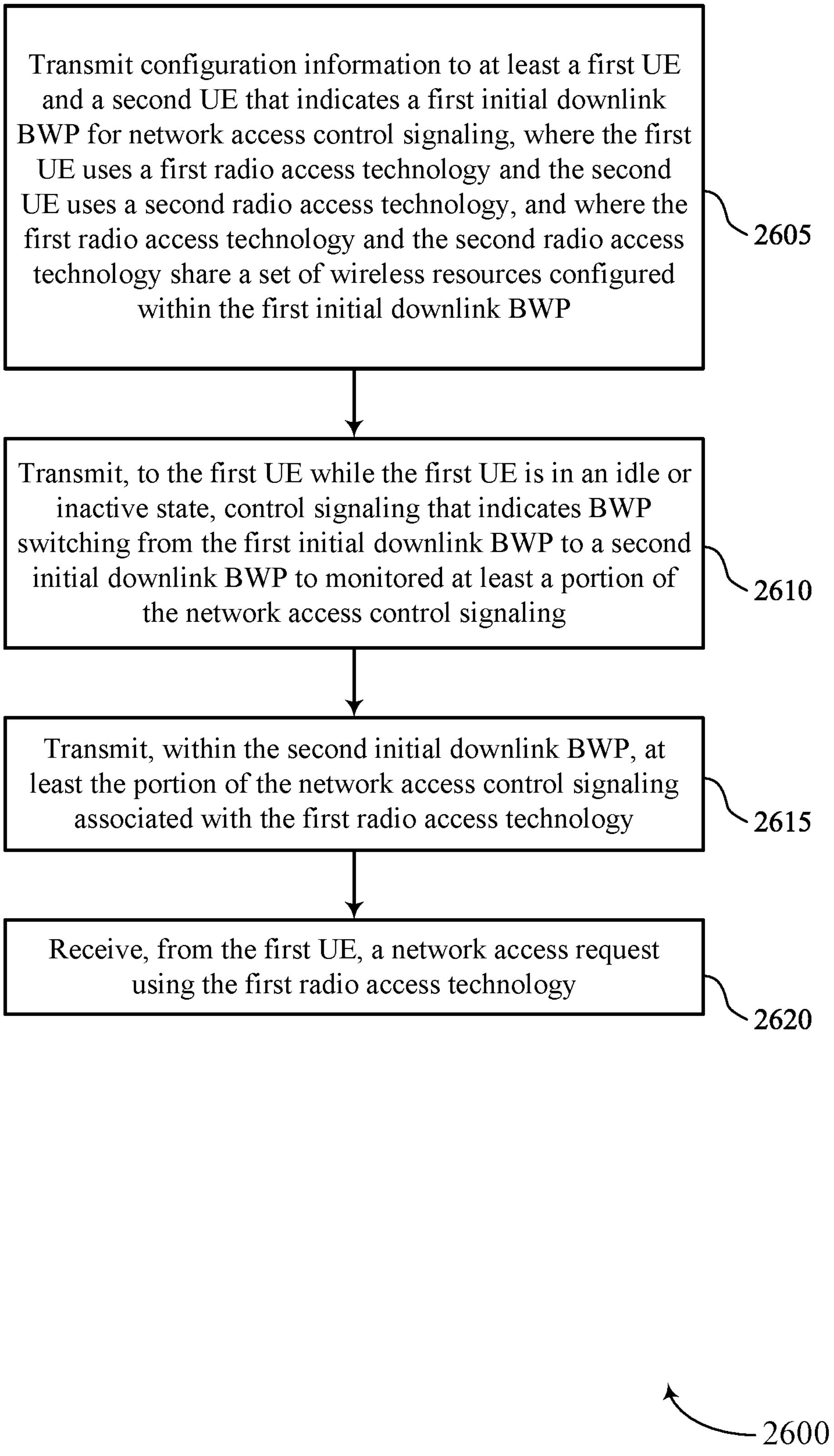

FIG. 26 shows a flowchart illustrating a method 2600 that supports techniques for accessing multiple radio access technology spectrum sharing in accordance with aspects of the present disclosure. The operations of the method 2600 may be implemented by a network entity or its components as described herein. For example, the operations of the method 2600 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2605, the method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP. The operations of block 2605 may be performed in accordance with examples as disclosed herein. In some examples, aspects of the operations of 2605 may be performed by a configuration manager 1525 as described with reference to FIG. 15.

At 2610, the method may include transmitting, to the first UE while the first UE is in an idle or inactive state, control signaling that indicates BWP switching from the first initial downlink BWP to a second initial downlink BWP to monitored at least a portion of the network access control signaling. The operations of block 2610 may be performed in accordance with examples as disclosed herein. In some examples, aspects of the operations of 2610 may be performed by a network access manager 1530 as described with reference to FIG. 15.

At 2615, the method may include transmitting, within the second initial downlink BWP, at least the portion of the network access control signaling associated with the first radio access technology. The operations of block 2615 may be performed in accordance with examples as disclosed herein. In some examples, aspects of the operations of 2615 may be performed by a network access manager 1530 as described with reference to FIG. 15.

At 2620, the method may include receiving, from the first UE, a network access request using the first radio access technology. The operations of block 2620 may be performed in accordance with examples as disclosed herein. In some examples, aspects of the operations of 2620 may be performed by an access request manager 1535 as described with reference to FIG. 15.

Figure 27:
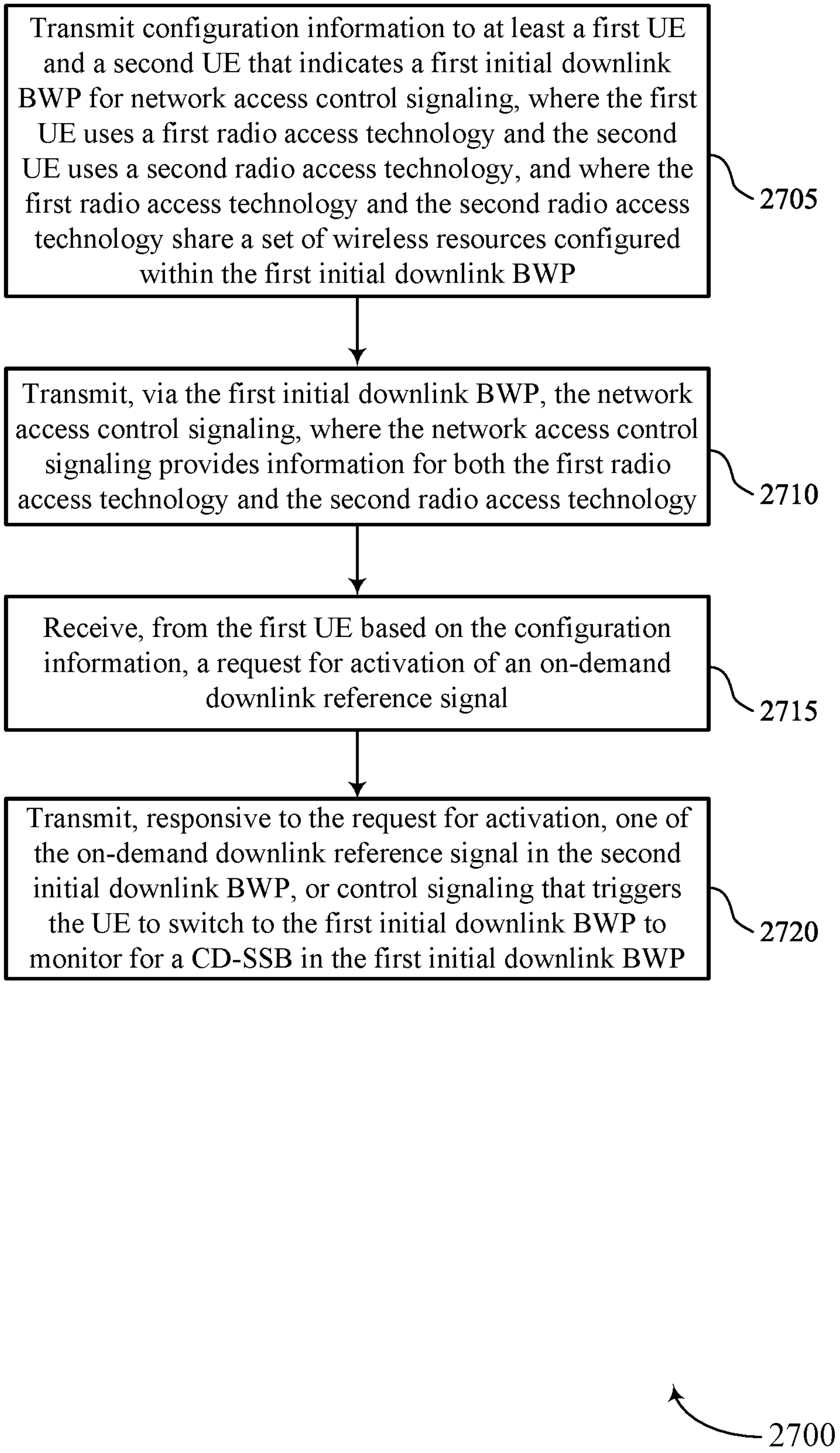

FIG. 27 shows a flowchart illustrating a method 2700 that supports techniques for accessing multiple radio access technology spectrum sharing in accordance with aspects of the present disclosure. The operations of the method 2700 may be implemented by a network entity or its components as described herein. For example, the operations of the method 2700 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2705, the method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP. The operations of block 2705 may be performed in accordance with examples as disclosed herein. In some examples, aspects of the operations of 2705 may be performed by a configuration manager 1525 as described with reference to FIG. 15.

At 2710, the method may include transmitting, via the first initial downlink BWP, the network access control signaling, where the network access control signaling provides information for both the first radio access technology and the second radio access technology. The operations of block 2710 may be performed in accordance with examples as disclosed herein. In some examples, aspects of the operations of 2710 may be performed by a network access manager 1530 as described with reference to FIG. 15.

At 2715, the method may include receiving, from the first UE based on the configuration information, a request for activation of an on-demand downlink reference signal. The operations of block 2715 may be performed in accordance with examples as disclosed herein. In some examples, aspects of the operations of 2715 may be performed by a reference signal activation manager 1560 as described with reference to FIG. 15.

At 2720, the method may include transmitting, responsive to the request for activation, one of the on-demand downlink reference signal in the second initial downlink BWP, or control signaling that triggers the UE to switch to the first initial downlink BWP to monitor for a cell-defining (CD) synchronization signal block (SSB) in the first initial downlink BWP. The operations of block 2720 may be performed in accordance with examples as disclosed herein. In some examples, aspects of the operations of 2720 may be performed by a reference signal transmission manager 1550 as described with reference to FIG. 15.

Figure 28:
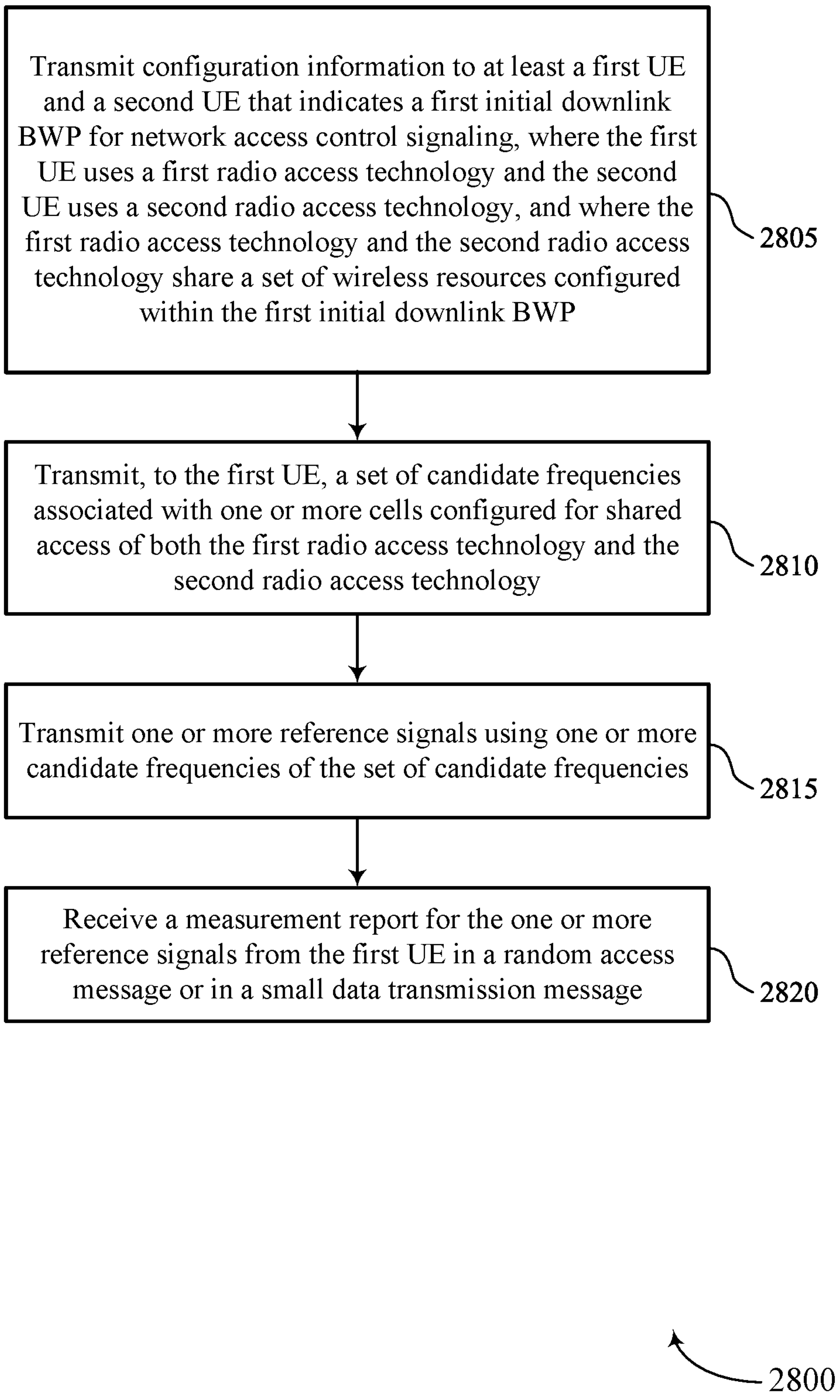

FIG. 28 shows a flowchart illustrating a method 2800 that supports techniques for accessing multiple radio access technology spectrum sharing in accordance with aspects of the present disclosure. The operations of the method 2800 may be implemented by a network entity or its components as described herein. For example, the operations of the method 2800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2805, the method may include transmitting configuration information to at least a first UE and a second UE that indicates a first initial downlink BWP for network access control signaling, where the first UE uses a first radio access technology and the second UE uses a second radio access technology, and where the first radio access technology and the second radio access technology share a set of wireless resources configured within the first initial downlink BWP. The operations of block 2805 may be performed in accordance with examples as disclosed herein. In some examples, aspects of the operations of 2805 may be performed by a configuration manager 1525 as described with reference to FIG. 15.

At 2810, the method may include transmitting, to the first UE, a set of candidate frequencies associated with one or more cells configured for shared access of both the first radio access technology and the second radio access technology. The operations of block 2810 may be performed in accordance with examples as disclosed herein. In some examples, aspects of the operations of 2810 may be performed by a candidate frequency manager 1545 as described with reference to FIG. 15.

At 2815, the method may include transmitting one or more reference signals using one or more candidate frequencies of the set of candidate frequencies. The operations of block 2815 may be performed in accordance with examples as disclosed herein. In some examples, aspects of the operations of 2815 may be performed by a reference signal transmission manager 1550 as described with reference to FIG. 15.

At 2820, the method may include receiving a measurement report for the one or more reference signals from the first UE in a random access message or in a small data transmission message. The operations of block 2820 may be performed in accordance with examples as disclosed herein. In some examples, aspects of the operations of 2820 may be performed by a measurement report manager 1555 as described with reference to FIG. 15.

The following provides an overview of aspects of the present disclosure:

Aspect 1: A method for wireless communication by a UE, comprising: receiving configuration information that indicates a first initial downlink BWP to monitor for network access control signaling, wherein a first radio access technology and a second radio access technology share a set of wireless resources that are configured within the first initial downlink BWP; operating on the first initial downlink BWP and monitoring the network access control signaling that includes network access information for both the first radio access technology and the second radio access technology; and transmitting a network access request using the first radio access technology based at least in part on the network access information from the network access control signaling.

Aspect 2: The method of aspect 1, wherein the monitoring comprises: monitoring for a CD-SSB and system information transmitted within the first initial downlink BWP, wherein the CD-SSB and system information provide synchronization and network access information for both the first radio access technology and the second radio access technology.

Aspect 3: The method of any of aspects 1 through 2, further comprising: receiving additional configuration information associated with the first radio access technology that indicates one or more of a second initial downlink BWP or a second initial uplink BWP that is associated with access for the first radio access technology, wherein the one or more of the second initial downlink BWP or the second initial uplink BWP are provided in addition to the first initial downlink BWP shared by the first radio access technology and the second radio access technology, or a first initial uplink BWP associated with the second radio access technology.

Aspect 4: The method of aspect 3, wherein the second initial downlink BWP has an associated center frequency that is unaligned with a center frequency of one or more of the first initial downlink BWP, the second initial uplink BWP associated with the first radio access technology, or the first initial uplink BWP associated with the second radio access technology.

Aspect 5: The method of any of aspects 1 through 4, further comprising: receiving, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology; and monitoring the second initial downlink BWP for at least the portion of the additional network access control signaling.

Aspect 6: The method of aspect 5, wherein the control signaling further indicates a second initial uplink BWP associated with network access for the first radio access technology that is different than a first initial uplink BWP associated with network access for the second radio access technology, and wherein the second initial uplink BWP is switched independent of which of the first initial downlink BWP or the second initial downlink BWP is monitored for the network access control signaling.

Aspect 7: The method of any of aspects 5 through 6, further comprising: transmitting, based at least in part on the configuration information for the first radio access technology, a request for activation of an on-demand downlink reference signal responsive to determining that the second initial downlink BWP does not include a cell-defining CD-SSB; and monitoring for the on-demand downlink reference signal on the second initial downlink BWP responsive to the request being granted, or switch to the first initial downlink BWP to monitor for a CD-SSB responsive to the request not being granted.

Aspect 8: The method of aspect 7, wherein the request for activation of the on-demand downlink reference signal is an explicit request or an implicit request provided via a PRACH, an PUSCH, a PUCCH, or any combinations thereof.

Aspect 9: The method of any of aspects 1 through 8, further comprising: receiving a set of candidate frequencies associated with one or more cells configured for shared access of both the first radio access technology and the second radio access technology, measuring one or more reference signals received via one or more candidate frequencies of the set of candidate frequencies; and transmitting a measurement report for the one or more reference signals in a random access message or in a small data transmission message.

Aspect 10: The method of aspect 9, wherein the set of candidate frequencies is received in one or more of RRC signaling, a system information communication, or a MBS communication, and wherein the set of candidate frequencies is received before or after releasing an RRC connection at the UE.

Aspect 11: A method for wireless communication by a UE, comprising: receiving a set of candidate frequencies for one or more measurements associated with a first initial downlink BWP that is used for wireless communications of both a first radio access technology and a second radio access technology; measuring one or more channel parameters associated with one or more candidate frequencies of the set of candidate frequencies; and transmitting a measurement report of the one or more channel parameters in a network access request using the first radio access technology or in a small data transmission using the first radio access technology.

Aspect 12: The method of aspect 11, wherein the set of candidate frequencies is received in one or more of RRC signaling, a system information communication, or a MBS communication, and wherein the set of candidate frequencies is received before or after releasing an RRC connection at the UE.

Aspect 13: The method of any of aspects 11 through 12, further comprising: receiving, after a release of an RRC connection, an updated set of candidate frequencies for one or more measurements, wherein the updated set of candidate frequencies is received as part of a random access procedure, as part of a small data transmission procedure, via a MCCH, via a MTCH, or as part of short message communication in an RRC inactive state or RRC idle state.

Aspect 14: The method of any of aspects 11 through 13, further comprising: receiving configuration information that indicates the first initial downlink BWP is to be monitored for network access control signaling, wherein the first radio access technology and the second radio access technology share a set of wireless resources that are configured within the first initial downlink BWP; operating on the first initial downlink BWP and monitoring the network access control signaling that includes network access information for both the first radio access technology and the second radio access technology; and transmitting a network access request to using the first radio access technology based at least in part on the network access information from the network access control signaling.

Aspect 15: The method of aspect 14, wherein the monitoring comprises: monitoring for a CD-SSB and system information that are transmitted within the first initial downlink BWP, where the CD-SSB and system information provide network access information for both the first radio access technology and the second radio access technology.

Aspect 16: A method for wireless communication by a network entity, comprising: transmitting configuration information to at least a first UE and a second UE that indicates a first initial downlink BWP for network access control signaling, wherein the first UE uses a first radio access technology and the second UE uses a second radio access technology, and wherein the first radio access technology and the second radio access technology share a set of wireless resources configured within the first initial downlink BWP; transmitting, via the first initial downlink BWP, the network access control signaling, wherein the network access control signaling provides information for both the first radio access technology and the second radio access technology; and receiving, from the first UE, a network access request using the first radio access technology.

Aspect 17: The method of aspect 16, wherein the network access control signaling is provided in a CD-SSB and system information transmitted in the first initial downlink BWP, wherein the CD SSB and system information provide network access information for both the first radio access technology and the second radio access technology.

Aspect 18: The method of any of aspects 16 through 17, further comprising: transmitting, to the first UE, additional configuration information associated with the first radio access technology that indicates one or more of a second initial downlink BWP or a second initial uplink BWP that is associated with network access for the first radio access technology, wherein the one or more of the second initial downlink BWP or the second initial uplink BWP are provided in addition to the first initial downlink BWP.

Aspect 19: The method of any of aspects 16 through 18, further comprising: transmitting, to the first UE while the first UE is in an idle or inactive state, control signaling that indicates BWP switching from the first initial downlink BWP to a second initial downlink BWP to monitored at least a portion of the network access control signaling; and transmitting, within the second initial downlink BWP, at least the portion of the network access control signaling associated with the first radio access technology.

Aspect 20: The method of aspect 19, further comprising: receiving, from the first UE based at least in part on the configuration information, a request for activation of an on-demand downlink reference signal; and transmitting, responsive to the request for activation, one of the on-demand downlink reference signal in the second initial downlink BWP, or control signaling that triggers the UE to switch to the first initial downlink BWP to monitor for a CD-SSB in the first initial downlink BWP.

Aspect 21: The method of any of aspects 16 through 20, further comprising: transmitting, to the first UE, a set of candidate frequencies associated with one or more cells configured for shared access of both the first radio access technology and the second radio access technology; transmitting one or more reference signals using one or more candidate frequencies of the set of candidate frequencies; and receiving a measurement report for the one or more reference signals from the first UE in a random access message or in a small data transmission message.

Aspect 22: A UE for wireless communication, comprising one or more processors; one or more memories coupled with the one or more processors; and instructions stored in the one or more memories and executable by the one or more processors to cause the UE to perform a method of any of aspects 1 through 10.

Aspect 23: A UE for wireless communication, comprising at least one means for performing a method of any of aspects 1 through 10.

Aspect 24: A non-transitory computer-readable medium storing code for wireless communication at a UE, the code comprising instructions executable by one or more processors to perform a method of any of aspects 1 through 10.

Aspect 25: A UE for wireless communication, comprising one or more processors; one or more memories coupled with the one or more processors; and instructions stored in the one or more memories and executable by the one or more processors to cause the UE to perform a method of any of aspects 11 through 15.

Aspect 26: A UE for wireless communication, comprising at least one means for performing a method of any of aspects 11 through 15.

Aspect 27: A non-transitory computer-readable medium storing code for wireless communication at a UE, the code comprising instructions executable by one or more processors to perform a method of any of aspects 11 through 15.

Aspect 28: A network entity for wireless communication, comprising one or more processors; one or more memories coupled with the one or more processors; and instructions stored in the one or more memories and executable by the one or more processors to cause the network entity to perform a method of any of aspects 16 through 21.

Aspect 29: A network entity for wireless communication, comprising at least one means for performing a method of any of aspects 16 through 21.

Aspect 30: A non-transitory computer-readable medium storing code for wireless communication at a network entity, the code comprising instructions executable by one or more processors to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication comprising:
- one or more processors;
- one or more memories coupled with the one or more processors; and
- instructions stored in the one or more memories and executable by the one or more processors to cause the UE to:
  - receive configuration information that indicates a first initial downlink bandwidth part (BWP) to monitor for network access control signaling, wherein a first radio access technology and a second radio access technology share a set of wireless resources that are configured within the first initial downlink BWP;
  - operate on the first initial downlink BWP and monitor for the network access control signaling comprising a cell-defining (CD) synchronization signal block (SSB) and system information transmitted within the first initial BWP, wherein the CD SSB and system information provide synchronization and network access information for both the first radio access technology and the second radio access technology, and wherein the network access information provides initial access information to initiate a connection using the first radio access technology and to initiate a connection using the second radio access technology; and
  - transmit a network access request using the first radio access technology based at least in part on the network access information from the network access control signaling.

2. The UE of claim 1, wherein the instructions are further executable by the one or more processors to cause the UE to:
- receive additional configuration information associated with the first radio access technology that indicates one or more of a second initial downlink BWP or a second initial uplink BWP that is associated with access for the first radio access technology, wherein the one or more of the second initial downlink BWP or the second initial uplink BWP are provided in addition to the first initial downlink BWP shared by the first radio access technology and the second radio access technology, or a first initial uplink BWP associated with the second radio access technology.

3. The UE of claim 2, wherein the second initial downlink BWP has an associated center frequency that is unaligned with a center frequency of one or more of the first initial downlink BWP, the second initial uplink BWP associated with the first radio access technology, or the first initial uplink BWP associated with the second radio access technology.

4. The UE of claim 1, wherein the instructions are further executable by the one or more processors to cause the UE to:
- receive, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology; and
- monitor the second initial downlink BWP for at least the portion of the additional network access control signaling.

5. The UE of claim 4, wherein the control signaling further indicates a second initial uplink BWP associated with network access for the first radio access technology that is different than a first initial uplink BWP associated with network access for the second radio access technology, and wherein the second initial uplink BWP is switched independent of which of the first initial downlink BWP or the second initial downlink BWP is monitored for the network access control signaling.

6. The UE of claim 4, wherein the instructions are further executable by the one or more processors to cause the UE to:
- transmit, based at least in part on the configuration information for the first radio access technology, a request for activation of an on-demand downlink reference signal responsive to determining that the second initial downlink BWP does not include a cell-defining (CD) synchronization signal block (SSB); and
- monitor for the on-demand downlink reference signal on the second initial downlink BWP responsive to the request being granted, or switch to the first initial downlink BWP to monitor for a CD-SSB responsive to the request not being granted.

7. The UE of claim 6, wherein the request for activation of the on-demand downlink reference signal is an explicit request or an implicit request provided via a physical random access channel (PRACH), a physical uplink shared channel (PUSCH), a physical uplink control channel (PUCCH), or any combinations thereof.

8. The UE of claim 1, wherein the instructions are further executable by the one or more processors to cause the UE to:

receive a set of candidate frequencies associated with one or more cells configured for shared access of both the first radio access technology and the second radio access technology, measure one or more reference signals received via one or more candidate frequencies of the set of candidate frequencies; and transmit a measurement report for the one or more reference signals in a random access message or in a small data transmission message.

9. The UE of claim 8, wherein the set of candidate frequencies is received in one or more of radio resource control (RRC) signaling, a system information communication, or a multicast and broadcast service (MBS) communication, and wherein the set of candidate frequencies is received before or after releasing an RRC connection at the UE.

10. A user equipment (UE) for wireless communication, comprising:

one or more processors;

one or more memories coupled with the one or more processors; and instructions stored in the one or more memories and executable by the one or more processors to cause the UE to:

receive a set of candidate frequencies for one or more measurements associated with a first initial downlink bandwidth part (BWP) that is used for wireless communications of both a first radio access technology and a second radio access technology, wherein the first initial downlink BWP provides initial access information to initiate a connection using the first radio access technology and to initiate a connection using the second radio access technology;

measure one or more channel parameters associated with one or more candidate frequencies of the set of candidate frequencies; and transmit a measurement report of the one or more channel parameters in a network access request using the first radio access technology or in a small data transmission using the first radio access technology.

11. The UE of claim 10, wherein the set of candidate frequencies is received in one or more of radio resource control (RRC) signaling, a system information communication, or a multicast and broadcast service (MBS) communication, and wherein the set of candidate frequencies is received before or after releasing an RRC connection at the UE.

12. The UE of claim 10, wherein the instructions are further executable by the one or more processors to cause the UE to:

receive, after a release of a radio resource control (RRC) connection, an updated set of candidate frequencies for one or more measurements, wherein the updated set of candidate frequencies is received as part of a random access procedure, as part of a small data transmission procedure, via a multicast control channel (MCCH), via a multicast traffic channel (MTCH), or as part of short message communication in an RRC inactive state or RRC idle state.

13. The UE of claim 10, wherein the instructions are further executable by the one or more processors to cause the UE to:

receive configuration information that indicates the first initial downlink BWP is to be monitored for network access control signaling, wherein the first radio access technology and the second radio access technology share a set of wireless resources that are configured within the first initial downlink BWP;

operate on the first initial downlink BWP and monitor the network access control signaling that includes network access information for both the first radio access technology and the second radio access technology; and transmit a network access request to using the first radio access technology based at least in part on the network access information from the network access control signaling.

14. The UE of claim 13, wherein the instructions to monitor are executable by one or more processors to cause the UE to:

monitor for a cell-defining (CD) synchronization signal block (SSB) and system information that are transmitted within the first initial downlink BWP, where the CD SSB and system information provide network access information for both the first radio access technology and the second radio access technology.

15. A network entity for wireless communication, comprising:

one or more processors;

one or more memories coupled with the one or more processors; and instructions stored in the one or more memories and executable by the one or more processors to cause the network entity to:

transmit configuration information to at least a first user equipment (UE) and a second UE that indicates a first initial downlink bandwidth part (BWP) for network access control signaling, wherein the first UE uses a first radio access technology and the second UE uses a second radio access technology, and wherein the first radio access technology and the second radio access technology share a set of wireless resources configured within the first initial downlink BWP;

transmit, via the first initial downlink BWP, the network access control signaling, wherein the network access control signaling provides initial access information for initiating a connection using the first radio access technology and for initiating a connection using the second radio access technology and the network access control signaling is provided in a cell-defining (CD) synchronization signal block (SSB) and system information transmitted in the first initial downlink BWP, wherein the CD SSB and system information provide network access information for both the first radio access technology and the second radio access technology; and receive, from the first UE, a network access request using the first radio access technology.

16. The network entity of claim 15, wherein the instructions are further executable by the one or more processors to cause the network entity to:

transmit, to the first UE, additional configuration information associated with the first radio access technology that indicates one or more of a second initial downlink BWP or a second initial uplink BWP that is associated with network access for the first radio access technology, wherein the one or more of the second initial downlink BWP or the second initial uplink BWP are provided in addition to the first initial downlink BWP.

17. The network entity of claim 15, wherein the instructions are further executable by the one or more processors to cause the network entity to:

transmit, to the first UE while the first UE is in an idle or inactive state, control signaling that indicates BWP switching from the first initial downlink BWP to a second initial downlink BWP to monitored at least a portion of the network access control signaling; and transmit, within the second initial downlink BWP, at least the portion of the network access control signaling associated with the first radio access technology.

18. The network entity of claim 17, wherein the instructions are further executable by the one or more processors to cause the network entity to:

receive, from the first UE based at least in part on the configuration information, a request for activation of an on-demand downlink reference signal; and transmit, responsive to the request for activation, one of the on-demand downlink reference signal in the second initial downlink BWP, or control signaling that triggers the UE to switch to the first initial downlink BWP to monitor for a cell-defining (CD) synchronization signal block (SSB) in the first initial downlink BWP.

19. The network entity of claim 15, wherein the instructions are further executable by the one or more processors to cause the network entity to:

transmit, to the first UE, a set of candidate frequencies associated with one or more cells configured for shared access of both the first radio access technology and the second radio access technology;

transmit one or more reference signals using one or more candidate frequencies of the set of candidate frequencies; and receive a measurement report for the one or more reference signals from the first UE in a random access message or in a small data transmission message.

20. A method for wireless communications by a user equipment (UE), comprising:

receiving configuration information that indicates a first initial downlink bandwidth part (BWP) to monitor for network access control signaling, wherein a first radio access technology and a second radio access technology share a set of wireless resources that are configured within the first initial downlink BWP;

operating on the first initial downlink BWP and monitoring for the network access control signaling comprising a cell-defining (CD) synchronization signal block (SSB) and system information transmitted within the first initial BWP, wherein the CD SSB and system information provide synchronization and network access information for both the first radio access technology and the second radio access technology, and wherein the network access information provides initial access information to initiate a connection using the first radio access technology and to initiate a connection using the second radio access technology; and transmitting a network access request using the first radio access technology based at least in part on the network access information from the network access control signaling.

21. The method of claim 20, further comprising:

receiving additional configuration information associated with the first radio access technology that indicates one or more of a second initial downlink BWP or a second initial uplink BWP that is associated with access for the first radio access technology, wherein the one or more of the second initial downlink BWP or the second initial uplink BWP are provided in addition to the first initial downlink BWP shared by the first radio access technology and the second radio access technology, or a first initial uplink BWP associated with the second radio access technology.

22. The method of claim 21, wherein the second initial downlink BWP has an associated center frequency that is unaligned with a center frequency of one or more of the first initial downlink BWP, the second initial uplink BWP associated with the first radio access technology, or the first initial uplink BWP associated with the second radio access technology.

23. The method of claim 20, further comprising:

receiving, while the UE is in an idle or inactive state, control signaling that indicates BWP switching from the first initial downlink BWP to a second initial downlink BWP, and operating on the second initial downlink BWP to monitor at least a portion of additional network access control signaling for the first radio access technology; and monitoring the second initial downlink BWP for at least the portion of the additional network access control signaling.

24. The method of claim 23, wherein the control signaling further indicates a second initial uplink BWP associated with network access for the first radio access technology that is different than a first initial uplink BWP associated with network access for the second radio access technology, and wherein the second initial uplink BWP is switched independent of which of the first initial downlink BWP or the second initial downlink BWP is monitored for the network access control signaling.

25. The method of claim 23, further comprising:

transmitting, based at least in part on the configuration information for the first radio access technology, a request for activation of an on-demand downlink reference signal responsive to determining that the second initial downlink BWP does not include a cell-defining (CD) synchronization signal block (SSB); and monitoring for the on-demand downlink reference signal on the second initial downlink BWP responsive to the request being granted, or switch to the first initial downlink BWP to monitor for a CD-SSB responsive to the request not being granted.

26. The method of claim 25, wherein the request for activation of the on-demand downlink reference signal is an explicit request or an implicit request provided via a physical random access channel (PRACH), a physical uplink shared channel (PUSCH), a physical uplink control channel (PUCCH), or any combinations thereof.

27. The method of claim 20, further comprising:

receiving a set of candidate frequencies associated with one or more cells configured for shared access of both the first radio access technology and the second radio access technology, measuring one or more reference signals received via one or more candidate frequencies of the set of candidate frequencies; and transmitting a measurement report for the one or more reference signals in a random access message or in a small data transmission message.

* * * * *